United States Patent
Nojima et al.

(10) Patent No.: US 9,256,356 B2
(45) Date of Patent: Feb. 9, 2016

(54) METHOD AND SYSTEM FOR PROVIDING FEEDBACK FOR DOCKING A CONTENT PANE IN A HOST WINDOW

(75) Inventors: Kathleen M. Nojima, San Jose, CA (US); Frederick T. Sharp, Menlo Park, CA (US); Chenhong Xia, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 972 days.

(21) Appl. No.: 11/781,868

(22) Filed: Jul. 23, 2007

(65) Prior Publication Data

US 2007/0266336 A1 Nov. 15, 2007

Related U.S. Application Data

(63) Continuation of application No. 10/704,050, filed on Nov. 6, 2003, now abandoned.

(51) Int. Cl.
*G06F 3/048* (2013.01)
*G06F 3/0486* (2013.01)
(Continued)

(52) U.S. Cl.
CPC ............. *G06F 3/0486* (2013.01); *G06F 3/011* (2013.01); *G06F 3/041* (2013.01); *G06F 3/0488* (2013.01); *G06F 2203/04808* (2013.01)

(58) Field of Classification Search
CPC . G06F 3/04812; G06F 3/0486; G06F 3/0483; G06F 3/0488; G06F 3/041; G06F 2203/04808; G06F 3/011
USPC ......... 715/788, 790, 854, 799, 769, 710, 712, 715/765, 767, 792, 798, 805
See application file for complete search history.

(56) References Cited

U.S. PATENT DOCUMENTS 5,146,556 A * 9/1992 Hullot ................. G06F 3/04845 715/781
5,504,853 A * 4/1996 Schuur ................ G06F 3/04845 715/781
(Continued)

FOREIGN PATENT DOCUMENTS

CA 2385224 * 5/2002 ................ G06F 3/14
JP 02257214 10/1990

OTHER PUBLICATIONS

Bing search q=dock%20arrangemenr%20different&qs= Jun. 1, 2015.*

(Continued)

*Primary Examiner* — Boris Pesin
*Assistant Examiner* — John Heffington
(74) *Attorney, Agent, or Firm* — Kali Law Group, P.C.

(57) ABSTRACT

A method and system for providing feedback for docking a content pane in a host window is disclosed. The method and system include providing a docking map. The docking map includes a plurality of docking areas there within. The method and system also include positioning a thumbnail associated with a content pane over one of the plurality of docking areas. Finally, the method and system include providing a hotspot on the thumbnail. The hotspot indicates that the content pane can be dropped into the one docking area. The feedback enables a user to precisely dock a content pane. In addition, a user can predict the final configuration of the host window. In addition, the docking of the content pane can determine complex configurations within a host window including nested splitters and notebooks whose tabs are oriented in any direction.

24 Claims, 20 Drawing Sheets

(51) Int. Cl.
*G06F 3/01* (2006.01)
*G06F 3/0488* (2013.01)
*G06F 3/041* (2006.01)

(56) References Cited

U.S. PATENT DOCUMENTS

| | | | | |
|---|---|---|---|---|
| 5,598,524 A * | 1/1997 | Johnston, Jr. | ......... | G06F 3/0486 715/769 |
| 5,644,737 A * | 7/1997 | Tuniman | ............... | G06F 3/0481 715/810 |
| 5,644,739 A | 7/1997 | Moursund | | |
| 5,668,964 A * | 9/1997 | Helsel | ................... | G06F 3/0483 715/776 |
| 5,714,971 A | 2/1998 | Shalit et al. | | |
| 5,808,610 A * | 9/1998 | Benson | ................ | G06F 3/0481 715/788 |
| 5,819,055 A * | 10/1998 | MacLean | ............... | G06F 3/0481 715/798 |
| 5,825,357 A | 10/1998 | Malamud et al. | | |
| 5,838,317 A * | 11/1998 | Bolnick | ................ | G06F 3/0481 707/999.007 |
| 5,845,299 A * | 12/1998 | Arora | ................... | G06F 17/218 715/209 |
| 5,864,330 A | 1/1999 | Haynes | | |
| 5,867,494 A | 2/1999 | Krishnaswamy et al. | | |
| 5,870,091 A * | 2/1999 | Lazarony, Jr. | ......... | G06F 3/0481 715/804 |
| 5,883,626 A * | 3/1999 | Glaser | ................ | G06F 17/2264 715/781 |
| 5,917,483 A * | 6/1999 | Duncan | ................ | G06F 3/0481 715/788 |
| 5,923,326 A * | 7/1999 | Bittinger | ............... | G06F 3/0481 715/805 |
| 5,949,417 A * | 9/1999 | Calder | .......................... | 715/788 |
| 5,949,418 A * | 9/1999 | Shields | ................ | G06F 3/0481 715/795 |
| 5,953,008 A | 9/1999 | Hagiuda | | |
| 5,966,122 A | 10/1999 | Itoh | | |
| 5,971,581 A | 10/1999 | Gretta et al. | | |
| 5,977,873 A * | 11/1999 | Woods | ............... | H01H 36/0073 335/205 |
| 5,977,973 A * | 11/1999 | Sobeski | ................... | G09G 5/14 715/798 |
| 5,999,177 A * | 12/1999 | Martinez | ............... | G06F 3/0481 715/235 |
| 5,999,525 A | 12/1999 | Krishnaswamy et al. | | |
| 6,008,809 A * | 12/1999 | Brooks | ................ | G06F 3/0481 715/792 |
| 6,023,272 A | 2/2000 | Malamud et al. | | |
| 6,035,264 A * | 3/2000 | Donaldson | .......... | G06F 9/45512 702/182 |
| 6,043,817 A * | 3/2000 | Bolnick | ................ | G06F 3/0481 715/788 |
| 6,072,486 A * | 6/2000 | Sheldon | ................ | G06F 3/0481 715/835 |
| 6,076,952 A | 6/2000 | Gretta et al. | | |
| 6,078,327 A | 6/2000 | Liman et al. | | |
| 6,108,003 A * | 8/2000 | Hall, Jr. | ................ | G06F 3/0481 715/772 |
| 6,141,007 A * | 10/2000 | Lebling | ............... | G06F 17/30716 707/E17.093 |
| 6,141,596 A | 10/2000 | Gretta et al. | | |
| 6,166,736 A * | 12/2000 | Hugh | ................... | G06F 3/0481 715/777 |
| 6,166,738 A | 12/2000 | Robertson et al. | | |
| 6,188,405 B1 | 2/2001 | Czerwinski et al. | | |
| 6,202,200 B1 * | 3/2001 | House | ................ | G06F 11/3664 707/999.01 |
| 6,239,799 B1 * | 5/2001 | Owings | .................... | G06F 8/38 715/786 |
| 6,252,594 B1 * | 6/2001 | Xia | ....................... | G06F 3/0485 715/234 |
| 6,282,547 B1 | 8/2001 | Hirsch | | |
| 6,310,631 B1 * | 10/2001 | Cecco | ................ | G06F 3/0481 715/792 |
| 6,335,927 B1 | 1/2002 | Elliot et al. | | |
| 6,336,146 B1 * | 1/2002 | Burridge et al. | ............... | 719/310 |
| 6,345,358 B1 | 2/2002 | Hall, Jr. et al. | | |
| 6,396,519 B1 | 5/2002 | Hall, Jr. et al. | | |
| 6,493,868 B1 * | 12/2002 | DaSilva | .................... | G06F 8/20 345/1.3 |
| 6,538,671 B1 * | 3/2003 | Hall et al. | ...................... | 715/781 |
| 6,539,538 B1 | 3/2003 | Brewster et al. | | |
| 6,683,629 B1 * | 1/2004 | Friskel | .................. | G06F 9/4443 715/804 |
| 6,765,592 B1 * | 7/2004 | Pletcher | ................ | G06F 9/4443 715/760 |
| 6,771,292 B2 * | 8/2004 | Sharp | .................... | G06F 3/0486 715/788 |
| 6,853,390 B1 * | 2/2005 | Wandersleben | ...... | G06F 3/0481 715/802 |
| 6,874,128 B1 * | 3/2005 | Moore | ................ | G06F 3/0486 715/759 |
| 6,957,395 B1 * | 10/2005 | Jobs | ........................ | G06F 3/0481 715/700 |
| 7,035,914 B1 * | 4/2006 | Payne | .................... | G08B 25/085 340/7.29 |
| 7,188,317 B1 * | 3/2007 | Hazel | .................... | G06F 9/4443 715/804 |
| D563,964 S * | 3/2008 | Viegers | ........................ | D14/485 |
| 7,362,341 B2 * | 4/2008 | McGuire | ................ | G06F 3/0481 345/676 |
| 7,403,211 B2 * | 7/2008 | Sheasby | ................ | G06T 11/60 345/660 |
| 7,434,177 B1 * | 10/2008 | Ording | ................ | G06F 3/04842 345/157 |
| 7,434,178 B2 * | 10/2008 | Sakata | .................... | G01C 21/36 715/727 |
| 7,555,730 B2 * | 6/2009 | Atkins | ..................... | G06T 11/60 715/713 |
| 7,636,899 B2 * | 12/2009 | Purcell | ................ | G06F 3/1431 345/634 |
| 7,644,356 B2 * | 1/2010 | Atkins | .................. | G06F 17/211 715/243 |
| 7,705,833 B2 * | 4/2010 | Kim | ..................... | G06F 3/04886 345/173 |
| 7,743,322 B2 * | 6/2010 | Atkins | ..................... | G06T 11/60 715/243 |
| 7,760,956 B2 * | 7/2010 | Lin | ..................... | G06K 9/00711 382/254 |
| 7,773,075 B2 * | 8/2010 | Otsuka | ................ | G01C 21/265 345/173 |
| 7,823,080 B2 * | 10/2010 | Miyajima | ............. | G06F 3/0481 715/781 |
| 7,948,504 B2 * | 5/2011 | Sheasby | ................ | G06T 11/60 345/660 |
| 7,979,809 B2 * | 7/2011 | Sunday | ................ | G06F 3/0483 345/156 |
| 7,984,383 B2 * | 7/2011 | Schell | ................ | G06F 3/0481 715/240 |
| 8,056,013 B2 * | 11/2011 | Atkins | ..................... | G06T 11/60 715/731 |
| 8,065,627 B2 * | 11/2011 | Atkins | ................ | G06F 17/509 715/788 |
| 8,285,499 B2 * | 10/2012 | Moore | ................ | G06F 3/04883 702/57 |
| D675,224 S * | 1/2013 | Lee | ............................ | D14/488 |
| 8,397,176 B2 * | 3/2013 | Subramanian | ........ | G06F 3/0481 715/711 |
| 8,407,626 B2 * | 3/2013 | Sunday | ................ | G06F 3/0483 345/156 |
| 8,418,076 B2 * | 4/2013 | Mail | ........................ | G06F 3/038 715/767 |
| 8,428,893 B2 * | 4/2013 | Moore | ................ | G06F 3/04883 702/57 |
| 8,434,019 B2 * | 4/2013 | Nelson | ................ | G06F 3/0481 715/788 |
| D681,665 S * | 5/2013 | Donahue | .................. | D14/488 |
| D681,666 S * | 5/2013 | Donahue | .................. | D14/488 |
| D682,307 S * | 5/2013 | Donahue | .................. | D14/488 |
| D682,308 S * | 5/2013 | Donahue | .................. | D14/488 |
| D682,878 S * | 5/2013 | Donahue | .................. | D14/488 |
| 8,438,495 B1 * | 5/2013 | Gilra | ................ | G06F 3/0481 345/173 |

(56) References Cited

U.S. PATENT DOCUMENTS

| | | | | |
|---|---|---|---|---|
| 8,458,615 B2* | 6/2013 | Chaudhri | G06F 3/04817 | 715/784 |
| 8,552,999 B2* | 10/2013 | Dale | G06F 3/04886 | 345/173 |
| 8,566,044 B2* | 10/2013 | Shaffer | G06F 3/04883 | 345/173 |
| 8,566,045 B2* | 10/2013 | Shaffer | G06F 3/04883 | 345/173 |
| 8,648,825 B2* | 2/2014 | Sirpal | G06F 1/1616 | 345/1.1 |
| 8,682,602 B2* | 3/2014 | Moore | G06F 3/04883 | 702/57 |
| 2001/0040590 A1* | 11/2001 | Abbott | G06F 1/163 | 715/700 |
| 2001/0045965 A1* | 11/2001 | Orbanes | G06F 3/0346 | 715/841 |
| 2002/0054136 A1* | 5/2002 | Andrew | G06F 3/0481 | 715/800 |
| 2002/0080280 A1* | 6/2002 | Champion | G09G 5/00 | 348/584 |
| 2002/0130904 A1* | 9/2002 | Becker | G06F 3/0481 | 715/753 |
| 2002/0135617 A1* | 9/2002 | Samid | G09G 5/14 | 715/764 |
| 2002/0140737 A1* | 10/2002 | Sharp | G06F 3/0486 | 715/788 |
| 2002/0191028 A1* | 12/2002 | Senechalle | G09G 5/14 | 715/800 |
| 2002/0199173 A1* | 12/2002 | Bowen | 717/129 | |
| 2003/0028864 A1* | 2/2003 | Bowen | 717/141 | |
| 2003/0033588 A1* | 2/2003 | Alexander | 717/107 | |
| 2003/0033594 A1* | 2/2003 | Bowen | 717/141 | |
| 2003/0037321 A1* | 2/2003 | Bowen | 717/149 | |
| 2003/0046668 A1* | 3/2003 | Bowen | 717/131 | |
| 2003/0046671 A1* | 3/2003 | Bowen | 717/141 | |
| 2003/0058286 A1* | 3/2003 | Dando | G06F 9/4443 | 715/853 |
| 2003/0074177 A1* | 4/2003 | Bowen | 703/22 | |
| 2003/0105620 A1* | 6/2003 | Bowen | G06F 17/5022 | 703/22 |
| 2003/0177501 A1* | 9/2003 | Takahashi | G09G 5/14 | 725/110 |
| 2003/0189597 A1* | 10/2003 | Anderson | G06F 3/0481 | 715/778 |
| 2003/0210274 A1* | 11/2003 | Subramanian | G06F 3/0481 | 715/809 |
| 2004/0008224 A1* | 1/2004 | Molander | G06F 3/0481 | 715/764 |
| 2004/0027350 A1* | 2/2004 | Kincaid | G06T 11/206 | 345/440 |
| 2004/0160462 A1* | 8/2004 | Sheasby | G06T 11/60 | 715/788 |
| 2004/0216036 A1* | 10/2004 | Chu | G06F 17/30899 | 715/202 |
| 2004/0239684 A1* | 12/2004 | McGuire et al. | 345/619 | |
| 2005/0091575 A1* | 4/2005 | Relyea | G06F 8/20 | 715/234 |
| 2005/0091576 A1* | 4/2005 | Relyea | G06F 9/4443 | 715/211 |
| 2005/0091594 A1* | 4/2005 | Parikh | G06T 11/206 | 715/700 |
| 2005/0091605 A1* | 4/2005 | Parikh | G06F 9/4443 | 715/788 |
| 2007/0064004 A1* | 3/2007 | Bonner | G06F 3/04883 | 345/442 |

OTHER PUBLICATIONS

Bing search q=docking+map+different&src=IE-Searc Jun. 1, 2015.*
Bing search q=dock%20arrangement%20different&qs= Jun. 1, 2015.*
Bing search q=dock%20configuration%20different&q Jun. 1, 2015.*
Bing search q=dock+layout+different&src=IE-Searc Jun. 1, 2015.*
Bing search q=docking+map+different&src+32 IE-Searc Jun. 1, 2015.*
Bing search q=multiple%20docking%20pane&qs=n&for Sep. 28, 2015.*
Bing search q=multiple%20docking%20windows&qs=n& Sep. 28, 2015.*
Bing search q=plural%20docking%20window&qs=n&for Sep. 28, 2015.*
Bing search q=plural+docking+panes&src=IE-Search Sep. 28, 2015.*

* cited by examiner

METHOD AND SYSTEM FOR PROVIDING FEEDBACK FOR DOCKING A CONTENT PANE IN A HOST WINDOW

CROSS-REFERENCE TO RELATED APPLICATIONS

Under 35 USC §120, this application is a continuation application and claims the benefit of priority to U.S. patent application Ser. No. 10/704,050, filed Nov. 6, 2003 entitled "METHOD AND SYSTEM FOR PROVIDING FEEDBACK FOR DOCKING A CONTENT PANE IN A HOST WINDOW", which is related to a co-pending U.S. application, Ser. No. 09/822,174, filed on Mar. 29, 2001, and entitled "METHOD AND SYSTEM FOR PROVIDING FEEDBACK CONCERNING A CONTENT PANE TO BE DOCKED IN A HOST WINDOW", all of which is incorporated herein by reference.

FIELD OF THE INVENTION

The present invention relates generally to docking and undocking a content pane in a host window of a computer, and more particularly to providing feedback for docking the content pane in the host window.

BACKGROUND OF THE INVENTION

Computer systems, which utilize a graphical user interface in a windows-like environment, will typically display a plurality of windows. Each of the windows can be moved via a pointing device. Typically each window has a separate existence on a graphical user interface desktop with its own content pane, docking pane, borders, title bar, and tool bar. A "content pane" is a pane that has arbitrary contents such as text. A content pane can be "undocked" and "docked" by moving it from one window into another window, referred to as a "host window." The user moves or "drags" the content pane using a dragging gesture of the mouse. A user can also move the content pane with arrow keys on a keyboard. When a content pane is docked, it may rest in a docking pane. A "docking pane" is an area inside the host window, which can host the content pane. So a content pane is undocked from the docking pane of one window and then docked or redocked into the docking pane of another window. To illustrate the docking and undocking feature, refer now to the following description in conjunction with the accompanying figures.

FIGS. 1 and 2 illustrate a conventional docking and undocking of a content pane 12 into a host window 10. In FIG. 1, docking and undocking feedback is provided by a dragged gray or black outline 14 through which the underlying components can be seen. This outline 14 shows the size and orientation of a window whether docking or undocking. When undocking the content pane 12, the outline 14 is a thick granular gray border with the size and orientation of the resulting window. In FIG. 2, when docking the content pane 12, the outline 15 is a thin black border with the size and orientation (but not the precise docking area) of the resulting docking pane. A result of docking (not shown) is a border region separated from the center of the host window with a splitter bar. A splitter bar, or "splitter," divides two panes arranged horizontally or vertically. The problems with the conventional docking and undocking of content panes utilizing the conventional method are described herein below.

Docking occurs only in the four border regions of the host window, not in the center of the host window. In a border region, multiple docking panes can be arranged in only one direction. Docking areas are limited to four docking areas. In the direction of the splitter bar, docking always occurs outside the split panes. Given a vertical splitter bar, for example, the left-top, left-bottom, right-top, and right-bottom docking areas are not available. The feedback during docking and undocking shows only the orientation and size of the resulting docked content pane, but not how the existing docking panes will be moved and resized. One conventional solution uses a technique where a transparent rectangle is displayed. The outline of the transparent rectangle changes shape and size to indicate a dockable docking area. Another conventional solution also uses this technique in combination with displaying different cursors to show dockable docking areas. Nevertheless, users still have difficulty predicting the arrangement of views that will result if they drop a view at a given location, because the feedback during docking and undocking does not show how the existing docking panes will be moved and resized.

Furthermore, a point on the mouse cursor, or a point on the object being dragged, called the hotspot, must be over a particular area on the screen to get a particular arrangement. Both the hotspot and the docking areas on the screen must be visible to the user to more accurately predict the resulting arrangement. Otherwise, when a content pane is placed in an ambiguous area, such as between two border regions, it is unpredictable where the content pane will be ultimately docked. Therefore, the visual feedback to the user must give the user an adequate indication of the ultimate result of the docking. Finally, there are typically areas in a host window that are not eligible for docking, and the locations of these areas are not clear unless both the hotspot and the docking areas on the screen are visible.

Accordingly, what is needed is a method and system for overcoming the above identified problems. The present invention addresses such a need.

SUMMARY OF THE INVENTION

A method and system for providing feedback for docking a content pane in a host window is disclosed. The method and system comprise providing a docking map. The docking map includes a plurality of docking areas therewithin. The method and system also include positioning a thumbnail associated with a content pane over one of the plurality of docking areas. Finally, the method and system include providing a hotspot on the thumbnail. The hotspot indicates that the content pane can be dropped into the one docking area. The feedback enables a user to precisely dock a content pane. In addition, a user can predict the final configuration of the host window. In addition, the docking of the content pane can determine complex configurations within a host window including nested splitters and notebooks whose tabs are oriented in any direction.

DETAILED DESCRIPTION

Definitions

Figure 1:
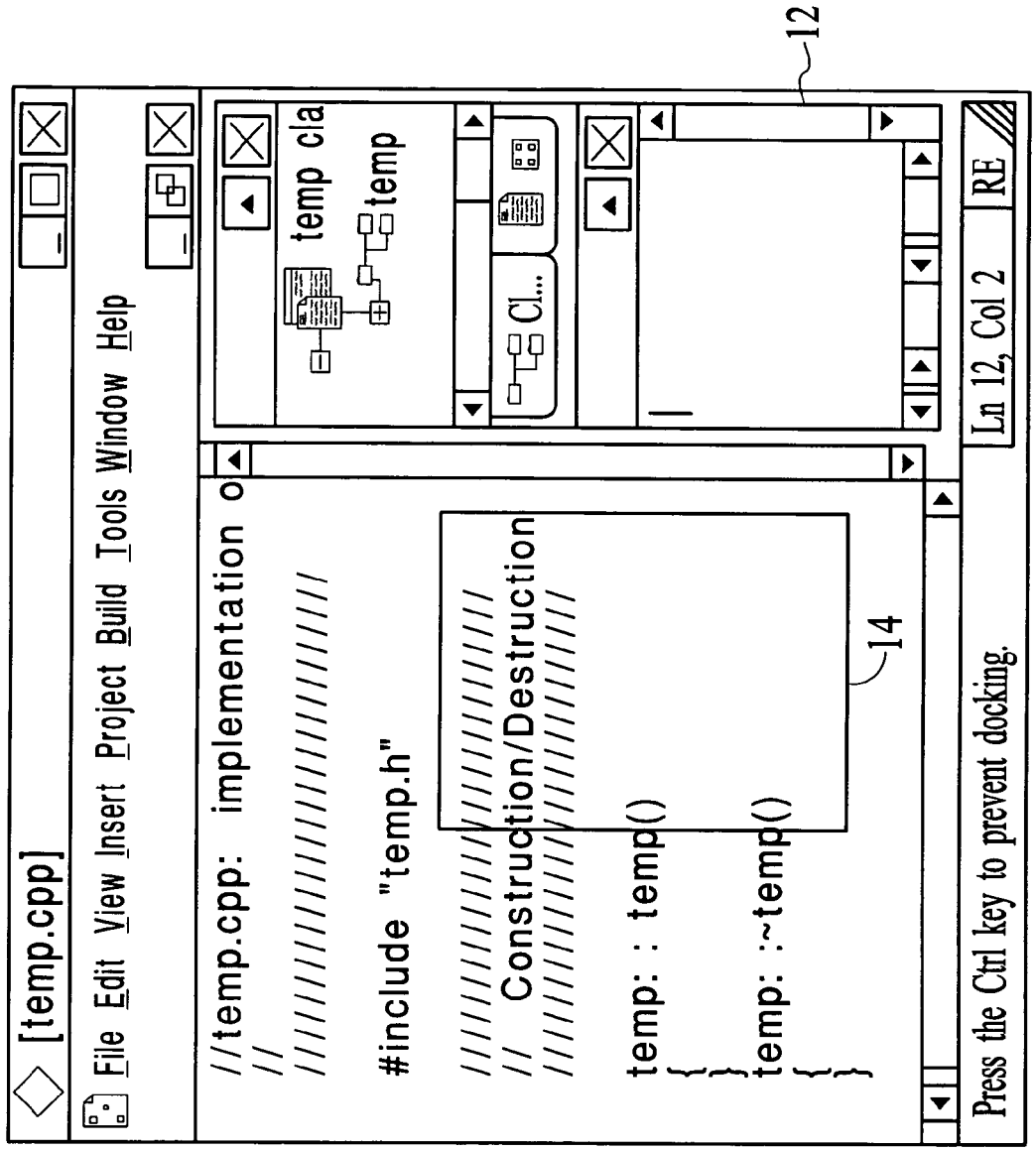
FIGS. 1 and 2 illustrate a conventional docking and undocking of a content pane into a host window.
Figure 2:
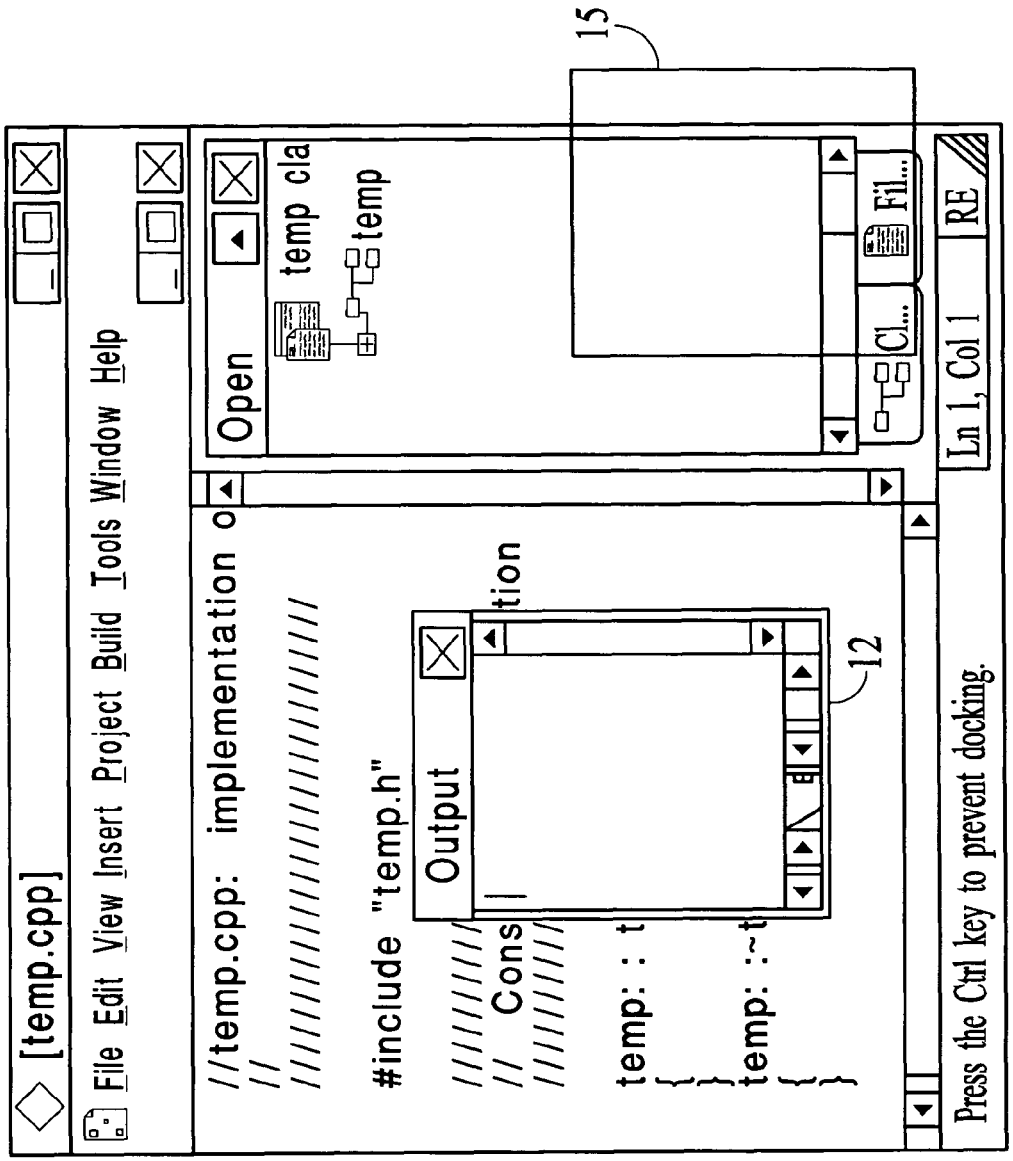

The following terms are defined in accordance with the present invention.

Host window—a window that can host other windows or views. A host window is also referred to as a parent window.

Docking pane—a pane or area inside the host window that can host one or more content panes or notebooks. A docking pane is also referred to as a docking frame.

Content pane—a pane that has content such as text and that can be moved from one docking pane to another. A content pane is amodal; that is, its appearance does not preclude interaction with other content panes or other GUI controls. A content pane is also referred to as a view.

Notebook—a stack of two or more content panes where each content pane has a tab that can be selected to make the contents of the content pane visible.

Docking area—an area within a docking pane into which a content pane can be dropped for docking. Each docking area has specific functions such as docking the content pane in a notebook with other existing content panes in a docking pane, or creating a new docking pane to host the content pane.

Drag window—a window that represents the content pane being dragged when it is not eligible to be docked.

Thumbnail—a window that is associated with the content pane and indicates the docking or floating potential of the content pane. The thumbnail represents the content pane being dragged into a docking area, a pointer, and the final configuration of the host window. A drag window shrinks down to or is replaced by a thumbnail when the content pane being dragged is eligible to be docked.

Hotspot—a portion of the thumbnail that indicates when a content pane can be dropped into a docking area. The hotspot is visibly distinct from other portions of the thumbnail to allow for precise dropping of the content pane into a docking area for docking.

Docking—adding a content pane to a docking pane.

Dropping—completing a drag. A content pane can be dropped into a docking area when the hotspot of the thumbnail is positioned over the docking area. A content pane can also be dropped over the desktop to undock or float it in its own window. The content pane can then be dropped typically when the mouse button, used to grab the content pane, is released.

Floating—also known as undocking, moving a content pane to a docking pane of its own, also referred to as its floating frame.

Toolbar—a pane with toolbar buttons that can be docked or floated.

Splitter—a bar that divides two docking panes arranged horizontally or vertically.

Present Invention

The present invention relates generally to docking and undocking a content pane in a host window of a computer, and more particularly to providing feedback for docking the content pane in the host window. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A method and system in accordance to the present invention for providing feedback for docking a content pane in a host window is disclosed. The method and system provide one or more docking maps that include a plurality of docking areas into which a content pane can be dropped for docking into a host window. To facilitate in the docking procedure, a thumbnail associated with the content pane is provided. A thumbnail is utilized to represent the arrangement of the host window if the user drops the content pane into a docking area. One embodiment of a thumbnail is described in a co-pending U.S. application Ser. No. 09/822,174, filed on Mar. 29, 2001, and entitled "Method and System for Providing Feedback Concerning A Content Pane To Be Docked In A Host Window." More specifically in accordance with this application, a system and method provide a representation of a position of the content pane within the host window and utilizes the thumbnail to indicate the position and the orientation of the content pane within the host window. The content pane is docked according to the representation and allows for docking to occur beyond the border regions. The thumbnail feedback when docking shows how existing docking panes will be moved and resized, as well as the orientation and relative size of the resulting docking pane. Although the thumbnail effectively operates in accordance with its stated purpose, there is always a desire to improve feedback to a user when utilizing content panes in a host window.

In a system in accordance with the present invention, a thumbnail has a visible hotspot making it easier to position the content pane over one of the docking areas. The hotspot provides an indication that the content pane can be accurately dropped into one of the docking areas. In addition, the docking areas provide multiple configurations that divide the docking pane with notebooks and splitters to position a content pane being dropped in relation to existing content panes. As a result, a user can precisely predict the final configuration of the host window, i.e., how the content pane will be docked and how the docking panes will adjust. To more particularly describe the features of the present invention, refer now to the following description in conjunction with the accompanying figures.

Figure 3:
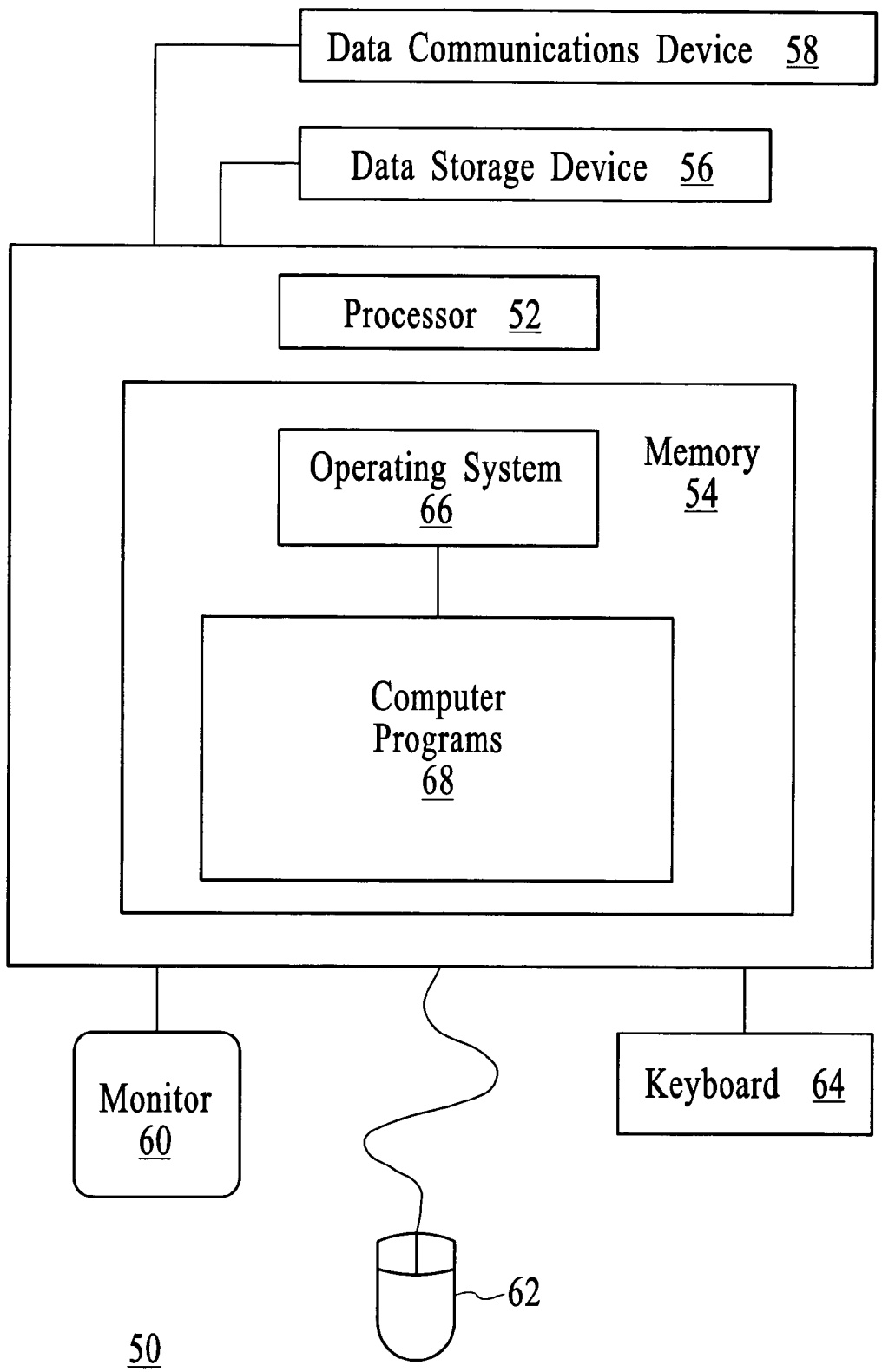
FIG. 3 illustrates a hardware environment used to implement a preferred embodiment of the present invention.

FIG. 3 illustrates a hardware environment used to implement an embodiment of the present invention. As illustrated in FIG. 3, the preferred embodiment of the present invention is implemented in a computer 50. The computer 50 generally includes a processor 52, a memory 54 such as a random access memory (RAM), a data storage device 56 (e.g., hard drive, floppy disk drive, CD-ROM disk drive, etc.), a data communication device 58 (e.g., a modem, network interface device, etc.), a monitor 60 (e.g., CRT, LCD display, etc.), a pointing device 62 (e.g., a mouse, a track ball, a pad or any other device responsive to touch, etc.) and a keyboard 64. It is envisioned that attached to the computer 50 may be other devices such as read only memory (ROM), a video card drive, printers, peripheral devices including local and wide area network interface devices, etc. One of ordinary skill in the art will recognize that any combination of the above components may be used to configure the computer 50.

The computer 50 operates under the control of an operating system ("OS") 66, such as MVS™, AIX®, UNIX®, OS2®, WINDOWS™, WINDOWS NT™, etc., which typically is loaded into the memory 104 during the computer 50 start up (boot-up) sequence after power-on or reset, (AIX and OS/2 are registered trademarks and MVS is a trademark of International Business Machines Corporation in the United States, other countries, or both. Windows and Windows NT are trademarks of Microsoft. Corporation. UNIX is a registered trademark in the United States and/or other countries licensed exclusively through X/Open Company Limited.) In operation, the OS 66 controls execution of computer programs 68 within the computer 50. Alternatively, a method, system, or computer readable medium in accordance with the present invention may be implemented with anyone or all of the computer programs 68 embedded in the OS 66 itself without departing from the scope of the present invention. Preferably, however, the client programs are separate from the computer programs.

The OS 66 and the computer programs 68 each comprise computer readable instructions which, in general, are tangibly embodied in or are readable from a media such as the memory 54, the data storage device 56 and/or the data communications device 58. When executed by the computer 50, the instructions cause the computer 50 to perform the steps necessary to implement the present invention. Thus, the present invention may be implemented as a method, system, or computer readable medium using programming and/or engineering techniques to produce software, hardware, firmware, or any combination hereof.

In accordance with the present invention, various embodiments for a window docking are presented that allow for feedback of the configurations displayed on a graphical user interface of the computer 50. Such a graphical user interface in a computer system may be implemented via conventional programming techniques. To describe the present invention in the context of a preferred embodiment, refer now to the following description in conjunction with the accompanying Figures.

Figure 4:
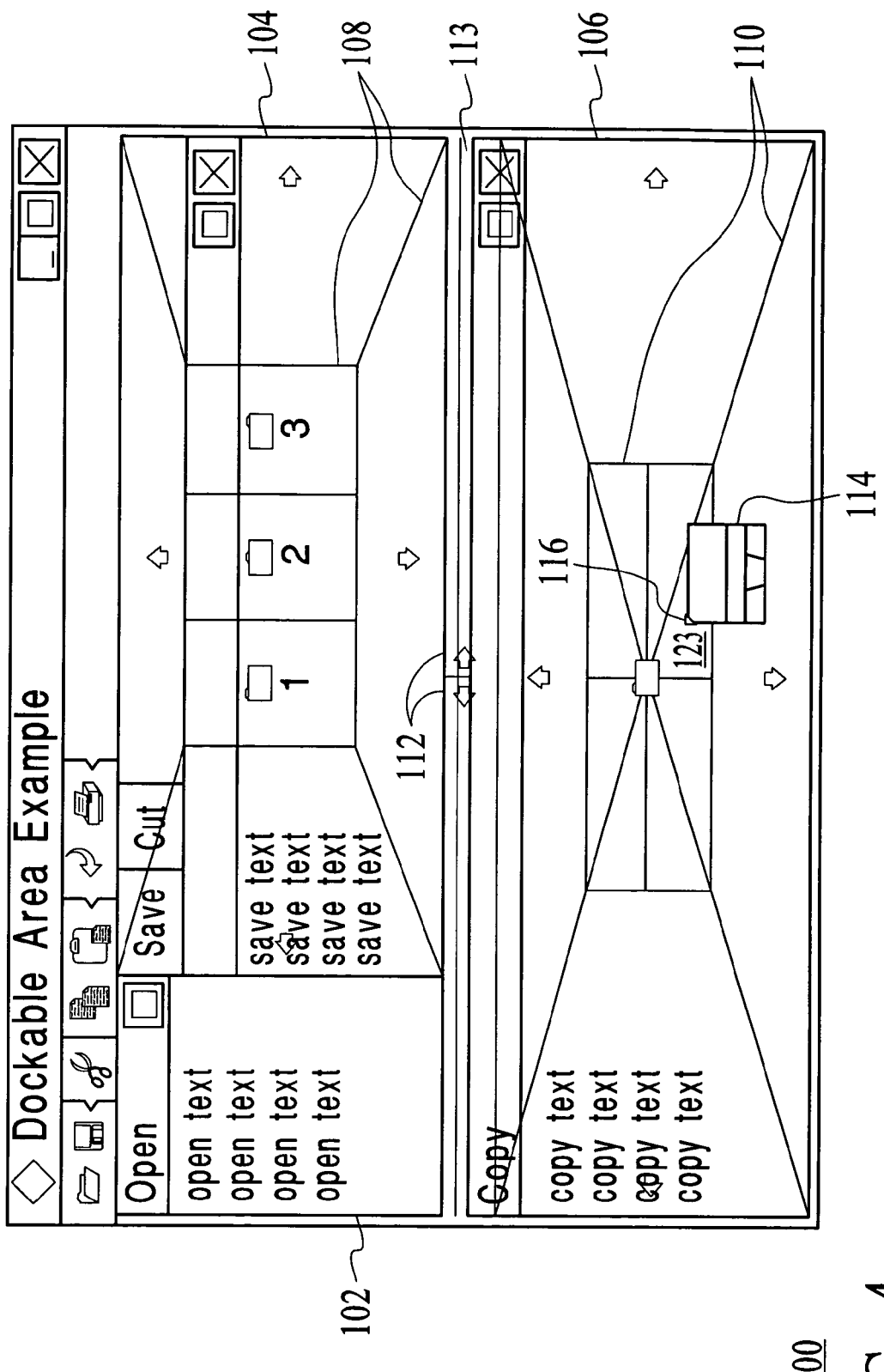
FIG. 4 is a diagram of a host window comprising a content pane, docking panes, docking maps, and a thumbnail in accordance with an embodiment of the present invention.

FIG. 4 is a diagram of a host window 100 comprising a content pane 102, docking panes 104 and 106, docking maps 108-112, and a thumbnail 114 in accordance with an embodiment of the present invention. As illustrated in FIG. 4, the docking maps 108 and 110 overlay the docking panes 104 and 106, respectively, and the docking map 112 overlays a splitter 113. The thumbnail 114 is associated with the content pane 102 and includes a hotspot 116. The number of content panes, docking panes, and splitters is arbitrary, and one of ordinary skill in the art would recognize that any number of content panes and splitters could be utilized within the scope and nature of the present invention. The "Dockable Area Example" shown in FIG. 4 is intended to illustrate as simply as possible the characteristics of the present invention; the preferred embodiment of the present invention applies to any computer software application with multiple content panes.

Figure 5:
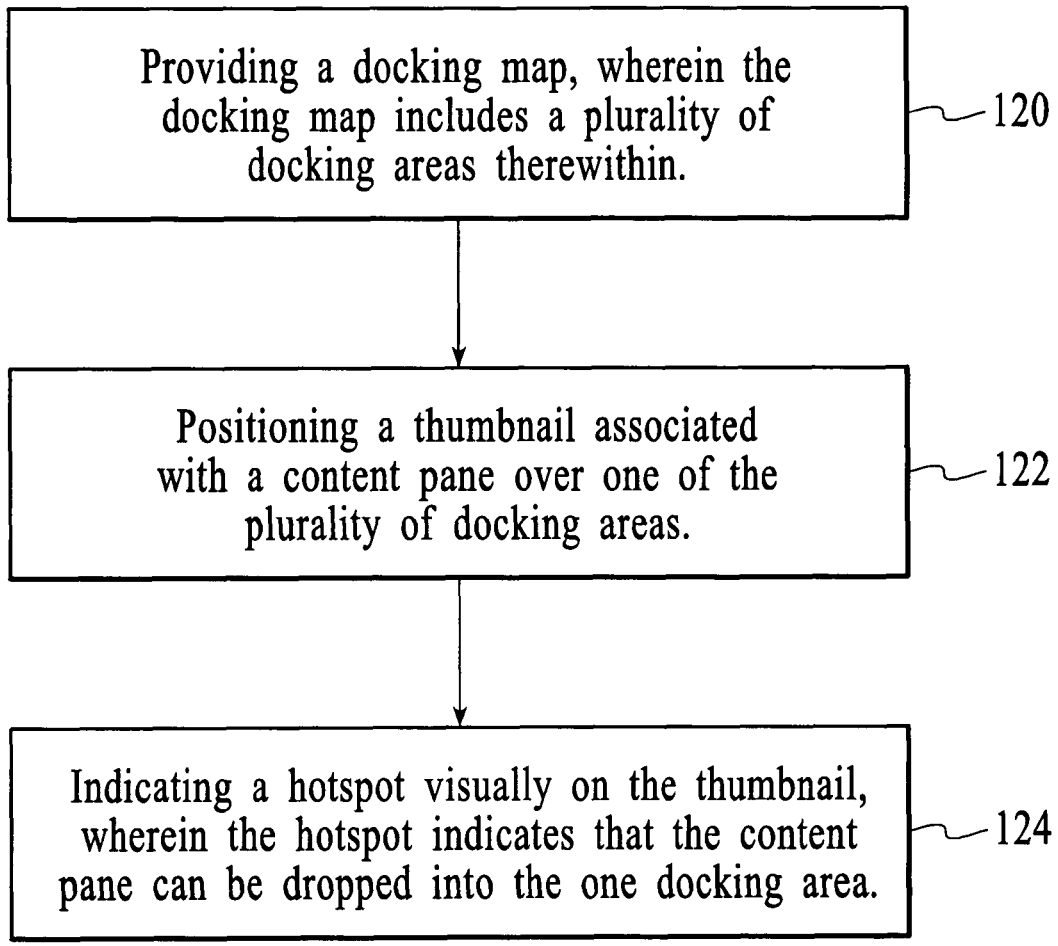
FIG. 5 is a simple flow chart for providing feedback for docking a content pane in a host window in accordance with an embodiment of the present invention.

FIG. 5 is a simple flow chart for providing feedback for docking a content pane in a host window in accordance with an embodiment of the present invention. First, referring to FIGS. 4 and 5 together, a docking map is provided, which includes a plurality of docking areas there within, via a step 120. The docking map can be any one of the docking maps 108, 110, or 112 (FIG. 4). Next, a thumbnail 114 associated with a content pane 102 is positioned over one of the plurality of docking areas, via a step 122.

A docking area 123 is an example of one of the plurality of docking areas. A hotspot 116 is indicated on the thumbnail 114, wherein the hotspot 116 indicates that the content pane 102 can be dropped into the one docking area, via a step 124.

The thumbnail 114 has three aspects. First, the thumbnail 114 represents the content pane 102 as it is being dragged when it is positioned over one of the plurality of docking areas, such as the docking area 123. Second, the thumbnail 114 represents a pointer in that the thumbnail 114 appears in lieu of the pointer. The hotspot 116 on the thumbnail 114 accurately indicates that the content pane 102 can be dropped into the one docking area when the hotspot 116 is within the boundaries of a docking area. Third, the thumbnail 114 represents the final configuration of the host window 100 resulting from dropping the content pane 102 in a particular docking area. The thumbnail 114 is described in more detail later in this application and more specifically in relation to FIG. 19.

The docking maps 108-112 include docking areas for three types of panes, respectively: the docking pane 104, which has an existing notebook with a plurality of existing content panes; the docking pane 106, which has an existing content pane and no existing notebook; and a pane 113, which is a splitter. Generally, the docking areas of the docking maps 108-112 determine configurations within a docking pane and/or docking pane configurations within the host window 100 in which the dragged content pane can be positioned in relation to other content panes using notebooks and splitters.

Figure 6:
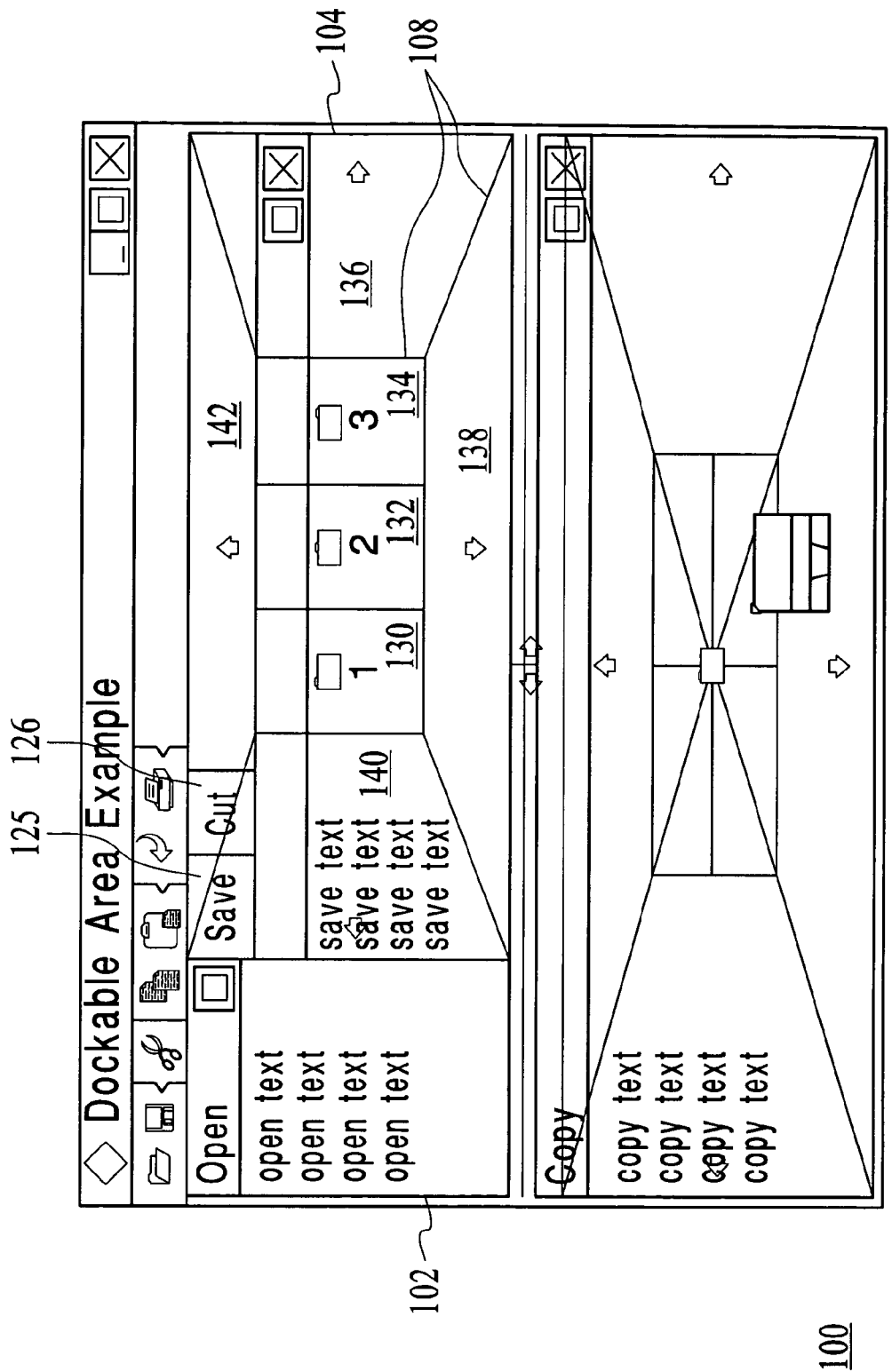
FIG. 6 illustrates a docking map of FIG. 4 in accordance with an embodiment of the present invention.

FIG. 6 illustrates the docking map 108 of FIG. 4 in accordance with an embodiment of the present invention. The docking map 108 includes docking areas 130-142 for docking the content pane 102 relative to the docking pane 104. The docking pane 104 has a notebook with two content panes. One content pane is labeled with a save tab 125 and one content pane is labeled with a cut tab 126. As is shown, the save tab 125 is selected so that a view of the save text is visible.

Figure 7:
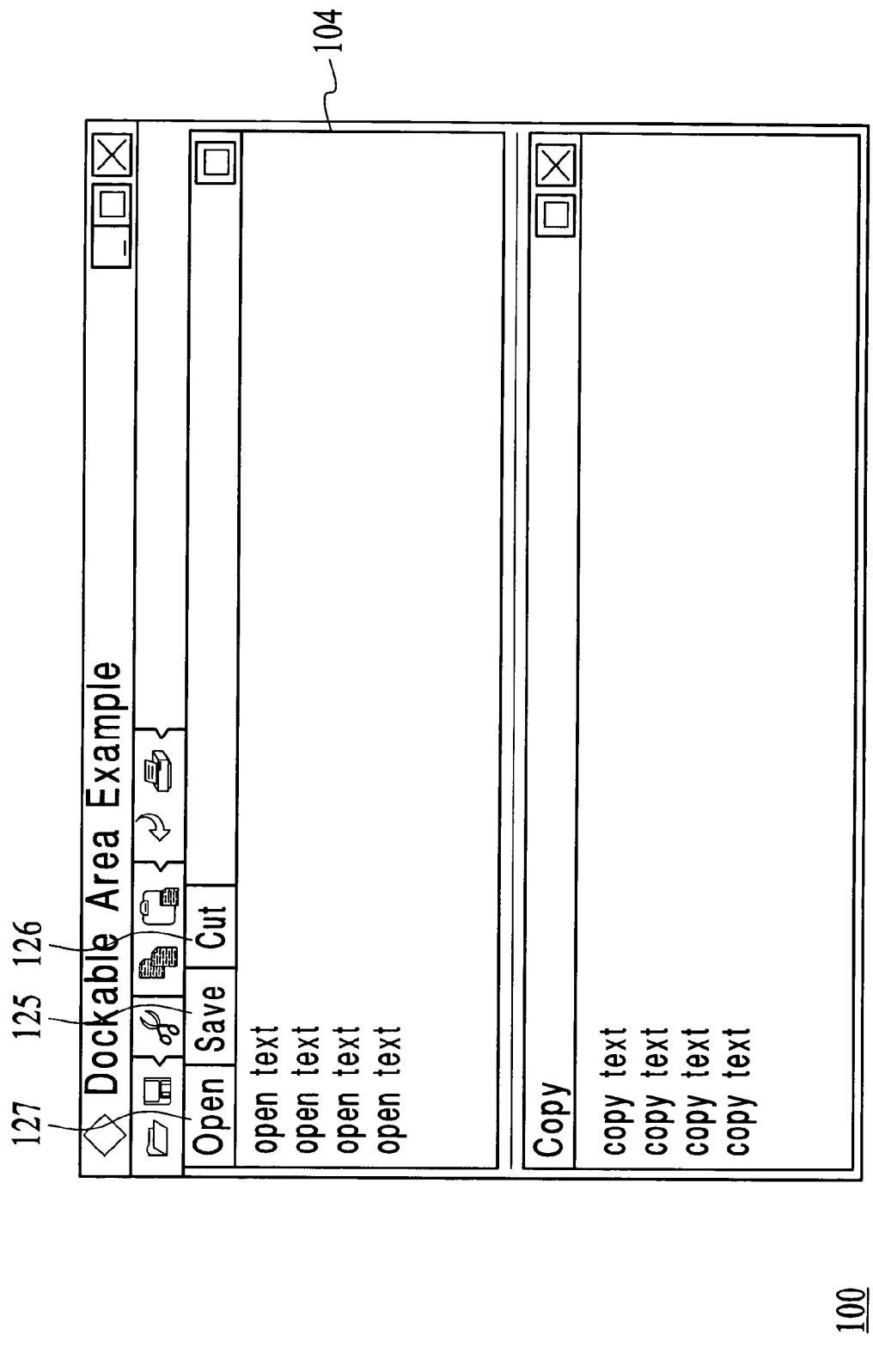
FIGS. 7-9 show resulting notebook configurations of a docking pane of FIG. 6 after docking a content pane in accordance with an embodiment of the present invention.
Figure 8:
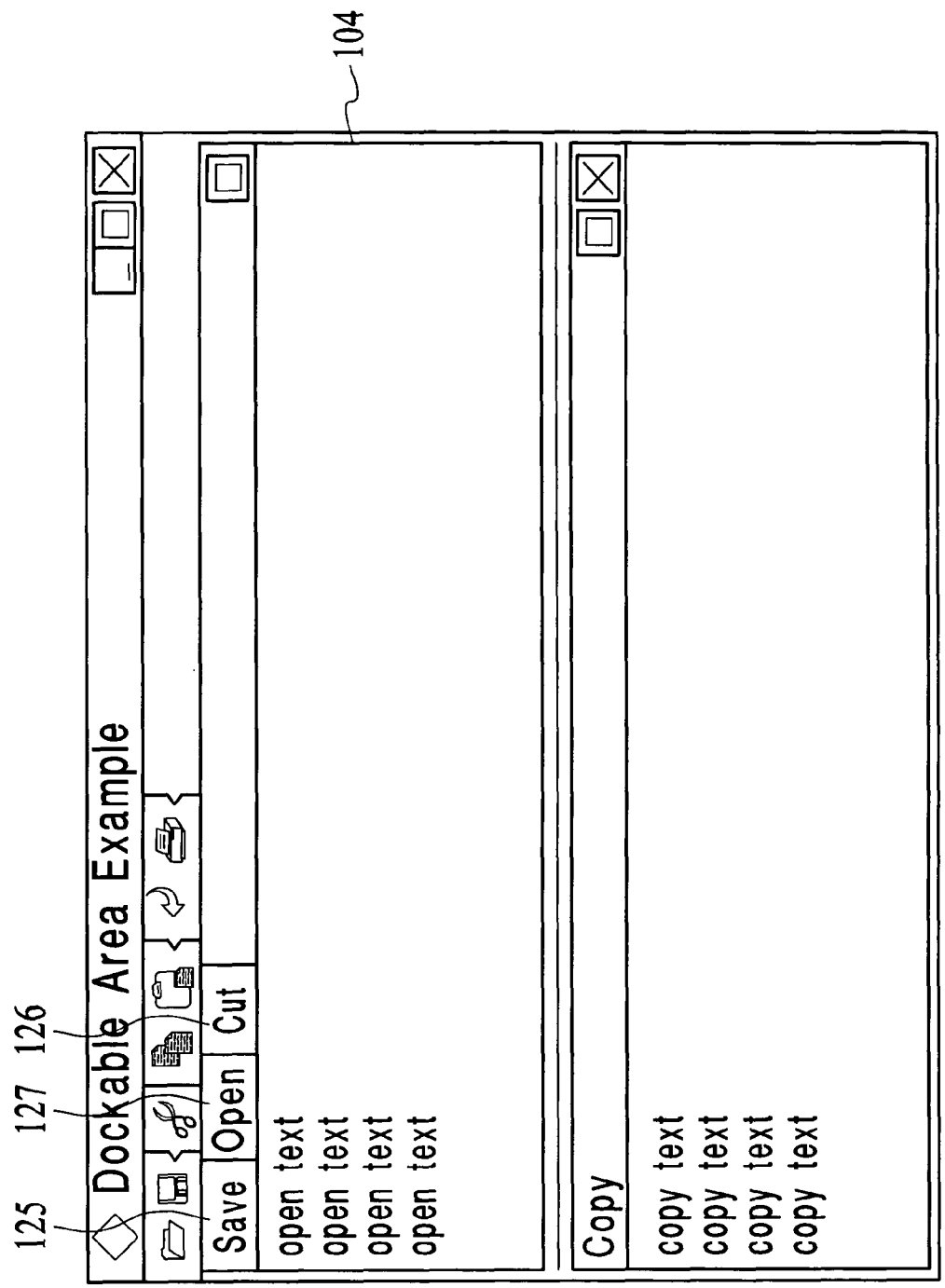
Figure 9:
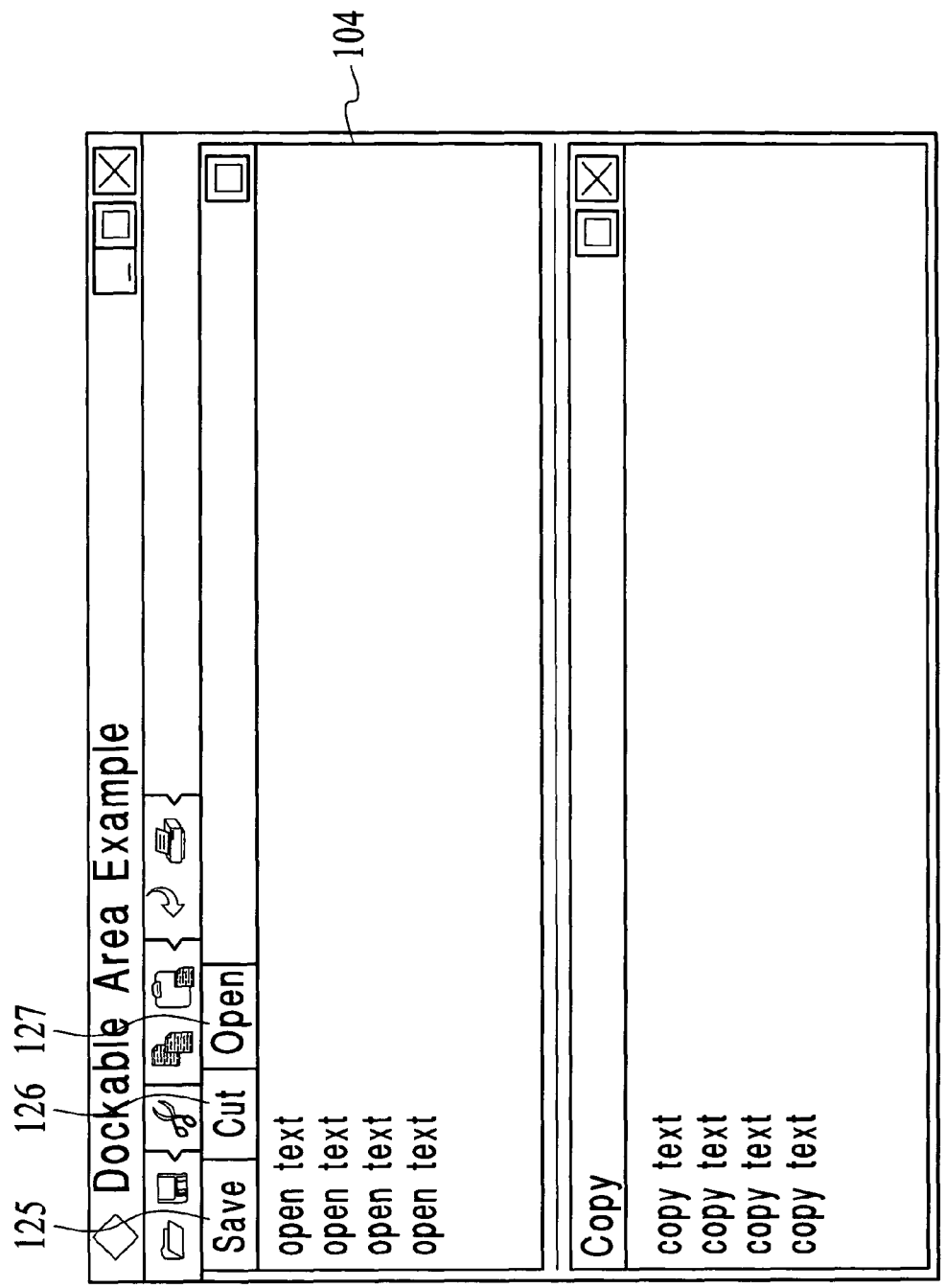

The docking areas 130-134 determine notebook configurations within the docking pane 104. Generally, dropping the content pane 102 into one of the docking areas 130-134 places the content pane 102 into the notebook of the docking pane 104 and configures the notebook. FIGS. 7-9 show resulting notebook configurations the docking pane 104 of FIG. 6 after docking the content pane 102 in accordance with an embodiment of the present invention. Referring to FIGS. 6 and 7, if the content pane 102 is dropped into the docking area 130, the content pane 102 is placed into the notebook and has an open tag 127 that is inserted into the first tab position from the left. Referring to FIGS. 6 and 8, it the content pane 102 is dropped into the docking area 132, the content pane 102 is placed into the notebook and the open tag 127 is inserted into the second tab position. Referring to FIGS. 6 and 9, if the content pane 102 is dropped into the docking area 134, the content pane 102 is placed into the notebook and the open tag 127 is inserted into the third tab position. Because a new content pane is potentially added to the notebook of the docking pane 104, there are n+1 docking areas available with the function of creating adding the new content pane, where n is the number of existing content panes in the notebook of docking pane 104.

In one embodiment, the relative positions of the docking areas indicate their function. In this specific embodiment, the docking areas 130-132 are located in the center of the docking map 108 to distinguish them from other types of docking areas (described further below). Symbols and/or labels can also be used to indicate the type or function of each docking area. Folder symbols are used to indicate a docking area for adding a new content pane to an existing notebook. Different folder symbols (tab on the left, tab in the middle, and tab on the right) are used to indicate different positions for a new tab of a notebook. In addition, different labels ("1," "2," and "3") are also used to indicate different positions for a new tab of a notebook. The specific symbols or labels used or combination thereof can be chosen by the user and will depend on the specific application. Furthermore, the appearance of the docking symbols and labels can be chosen by the user to ensure that they are readable. Furthermore, the docking symbols and labels can be turned on and off, manually or by default.

Figure 10:
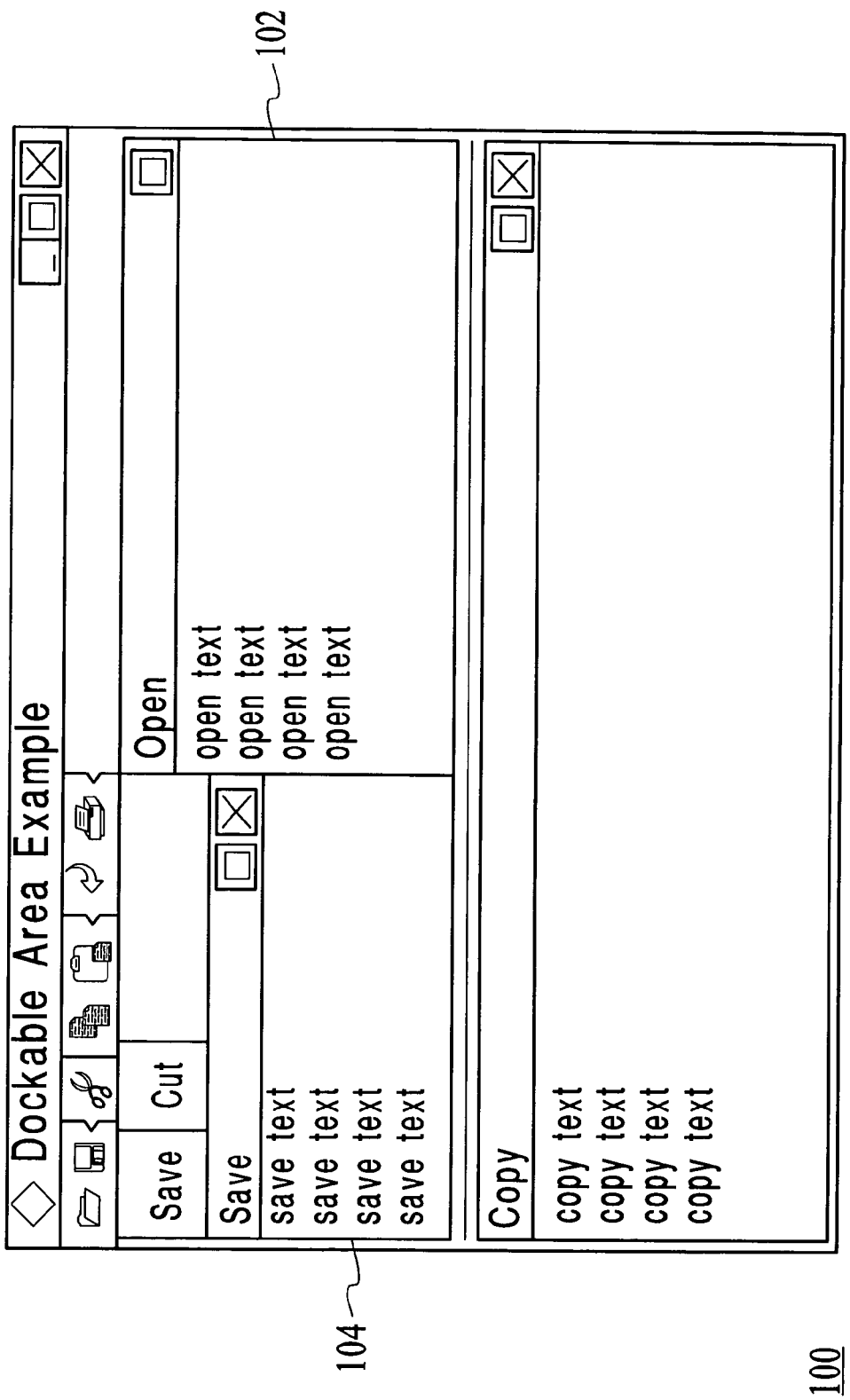
FIGS. 10 and 11 show resulting docking pane configurations within the host window of FIG. 6 after docking a content pane in accordance with an embodiment of the present invention.
Figure 11:
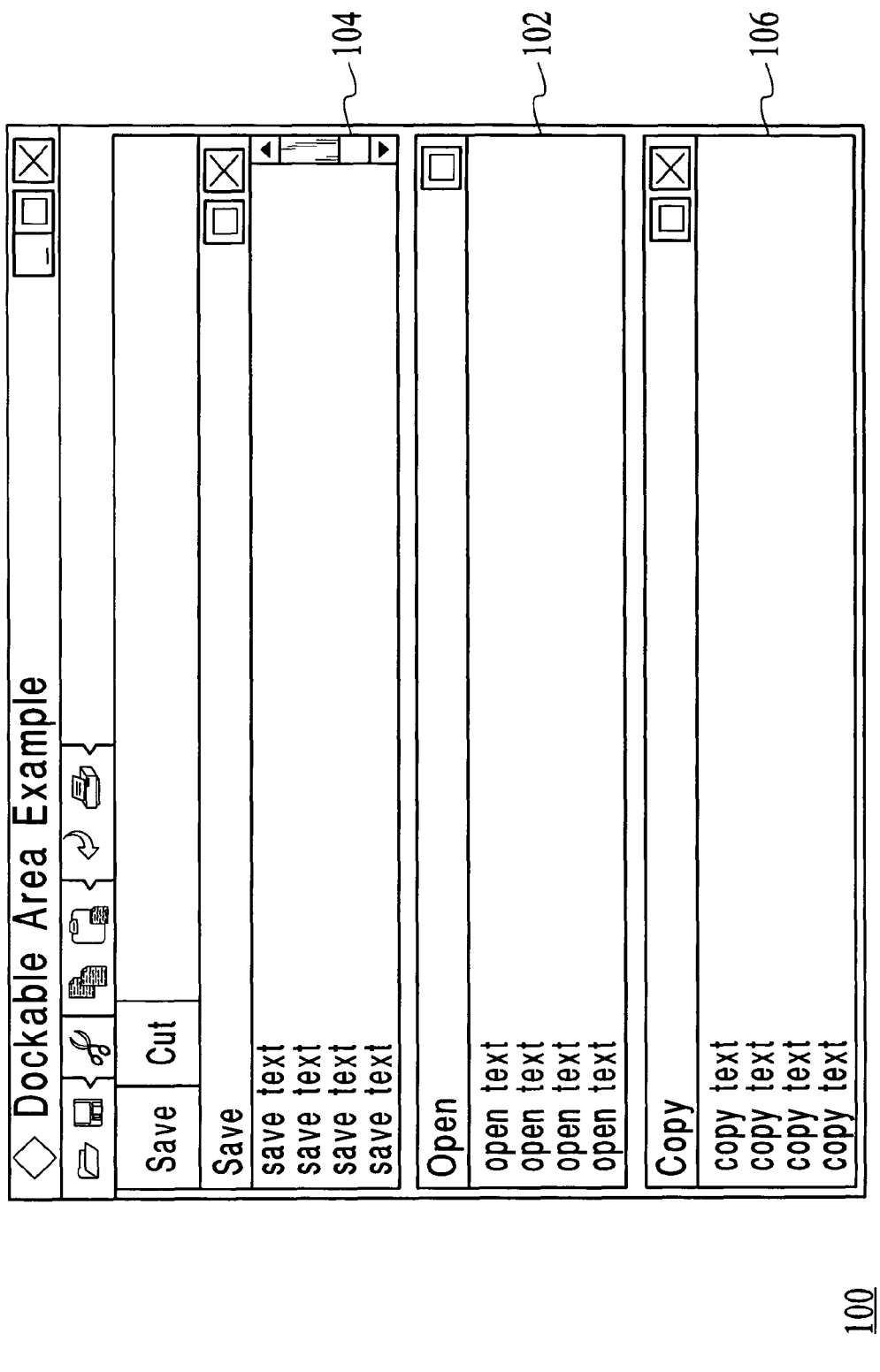

Referring to the docking areas 136-142 of FIG. 6, these docking areas determine docking pane configurations within the host window 100. Generally, dropping the content pane 102 into one of these docking areas 136-142 places the content pane 102 into its own docking pane adjacent to the docking pane 104 (separated by a splitter), and adjacent to the side of the docking pane 104 closest to the docking area into which the content pane 102 is dropped. FIGS. 10 and 11 show resulting docking pane configurations within the host window 100 of FIG. 6 after docking the content pane 102 in accordance with an embodiment of the present invention. Referring to FIGS. 6 and 10, if the content pane 102 is dropped into the docking area 136, the content pane 102 is placed into its own docking pane adjacent to and to the right of the docking pane 104. Referring to FIGS. 6 and 11, if the content pane 102 is dropped into the docking area 138, the content pane 102 is placed into its own docking pane adjacent to and below the docking pane 104, between the docking panes 104 and 106. Similarly, dropping the content pane 102 into the docking areas 140 or 142 places the content pane 102 in its own docking pane adjacent to the left or top of the docking pane 104, respectively.

The docking areas 136-142 are located along the borders of the docking pane 104 to distinguish them from other types of docking areas. Arrow symbols are used to indicate the docking location relative to the docking pane 104, i.e., to the sides of the docking pane 104 to which the arrow symbols are pointing. In a preferred embodiment, the docking maps are turned on by default. Alternatively, the docking maps, symbols, and labels can be turned on or off, manually or by default.

Figure 12:
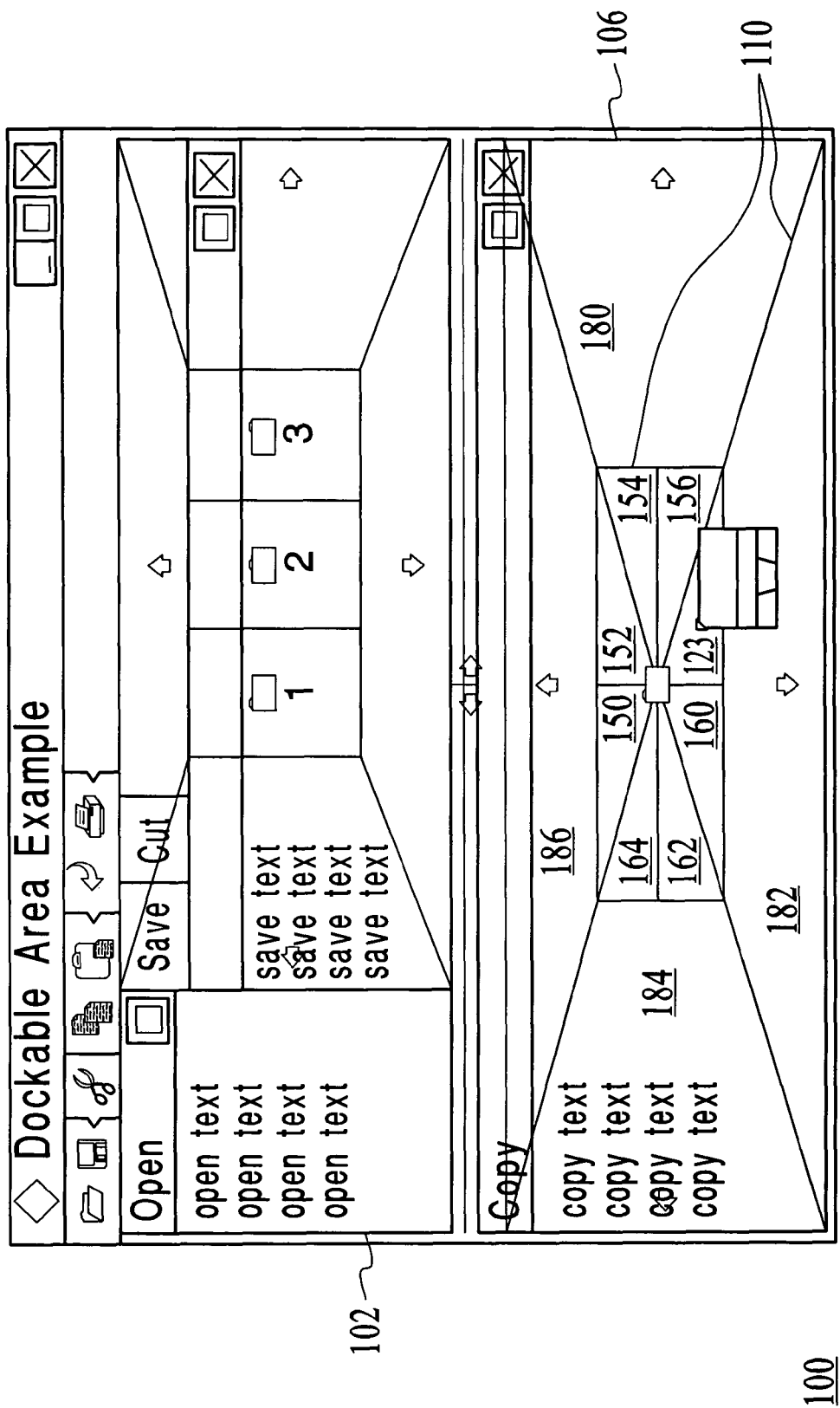
FIG. 12 illustrates a docking map of FIG. 4 in accordance with an embodiment of the present invention.

FIG. 12 illustrates the docking map 110 of FIG. 4 in accordance with an embodiment of the present invention. The docking map 110 includes docking areas 150-186 for docking the content pane 102 relative to the docking pane 106. The docking pane 106 has one existing content pane labeled "Copy."

The docking areas 150-156, 123, and 160-164 determine notebook configurations within the docking pane 106. Generally, dropping the content pane 102 into one of these docking areas 150-156, 123, and 160-164 places the content pane 102 and the existing copy content pane into a new notebook in the docking pane 104, and configures the notebook. A single notebook symbol is used to indicate the function of these docking areas 150-156, 123, and 160-164. The orientation of the tabs (bottom, left, top, or right side of the docking pane) and their relative tab positions are based on the docking area into which the content pane 102 is dropped.

Figure 13:
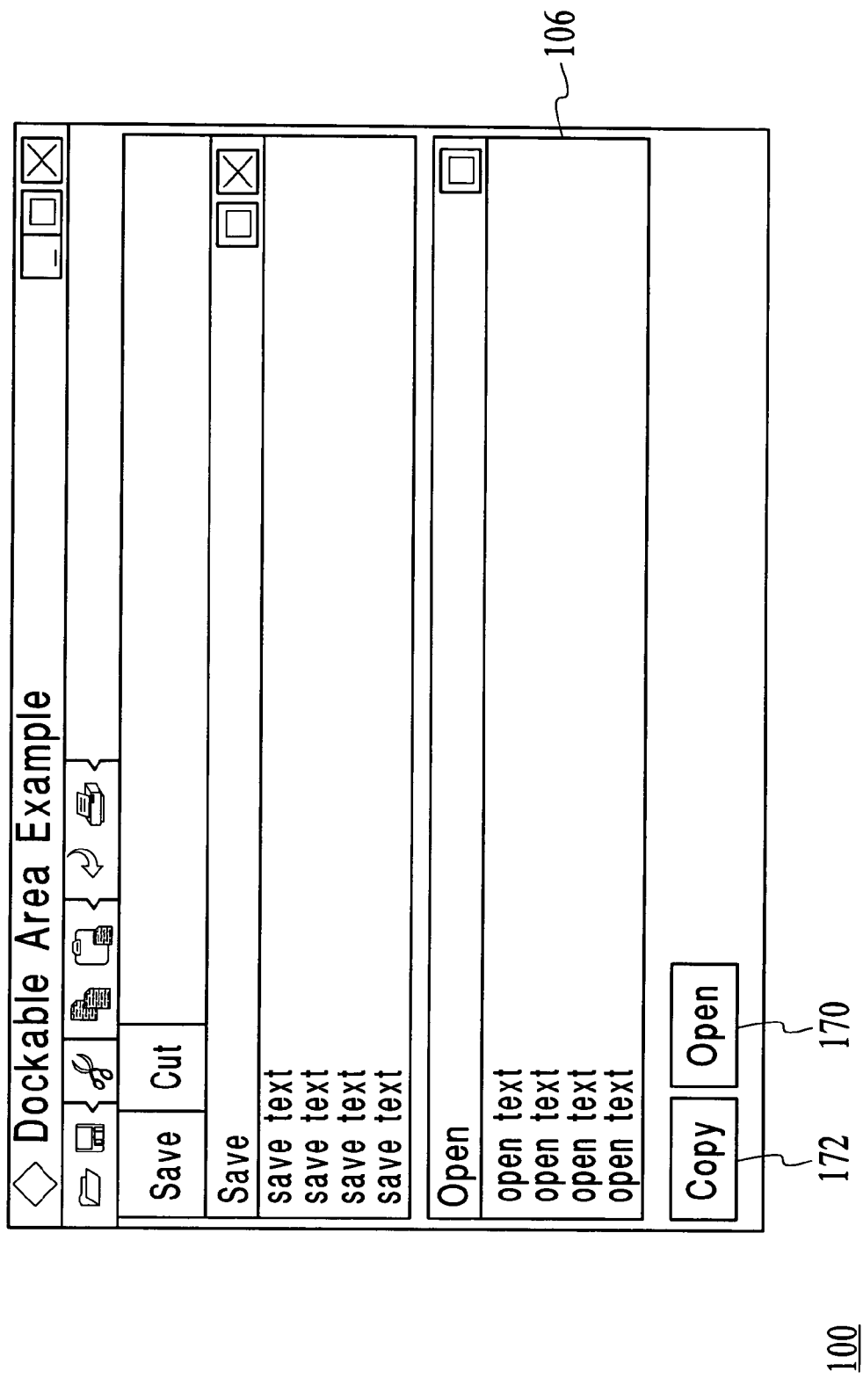
FIGS. 13-15 show resulting configurations of a new notebook of a docking pane of FIG. 12 after docking a content pane in accordance with an embodiment of the present invention.
Figure 14:
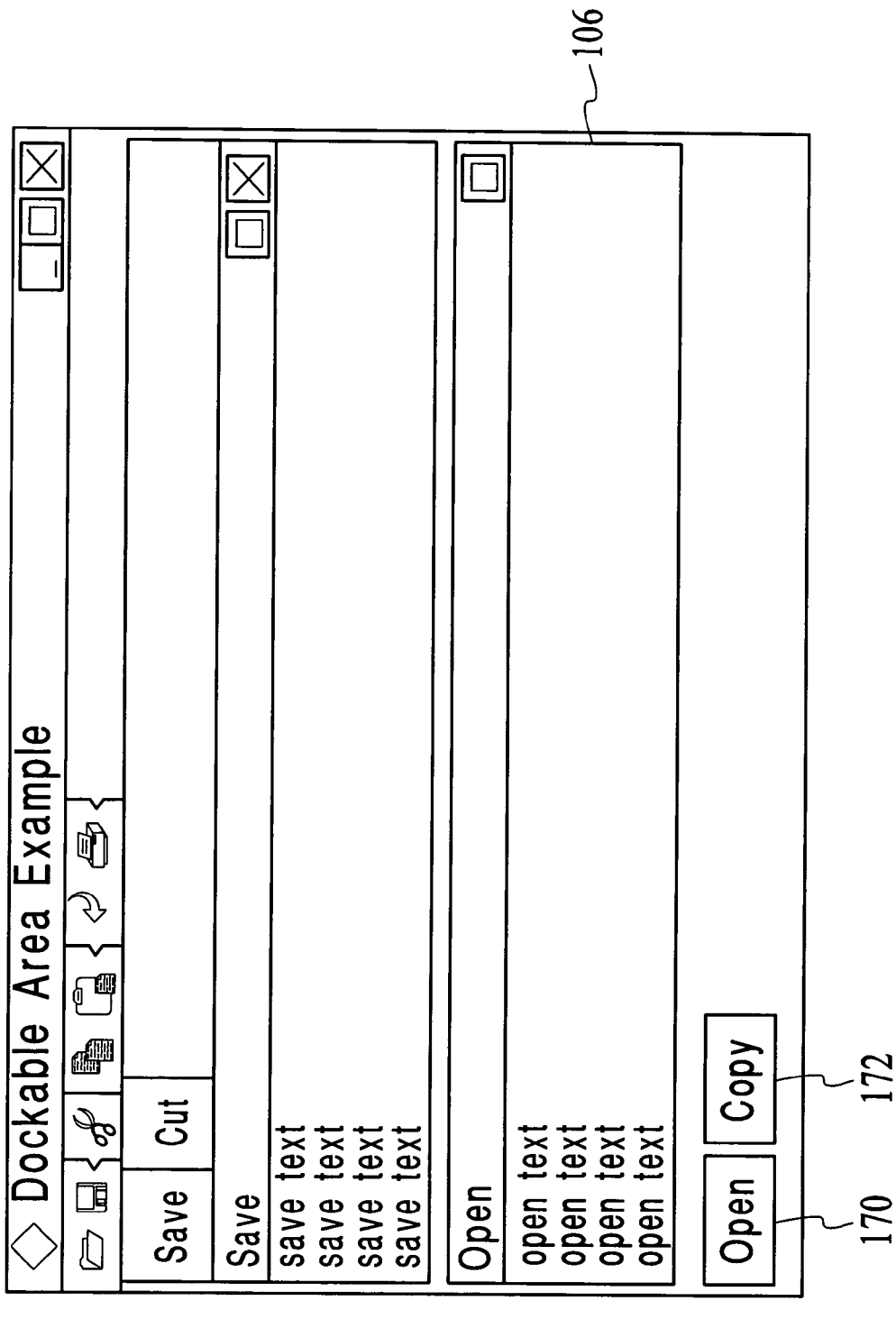
Figure 15:
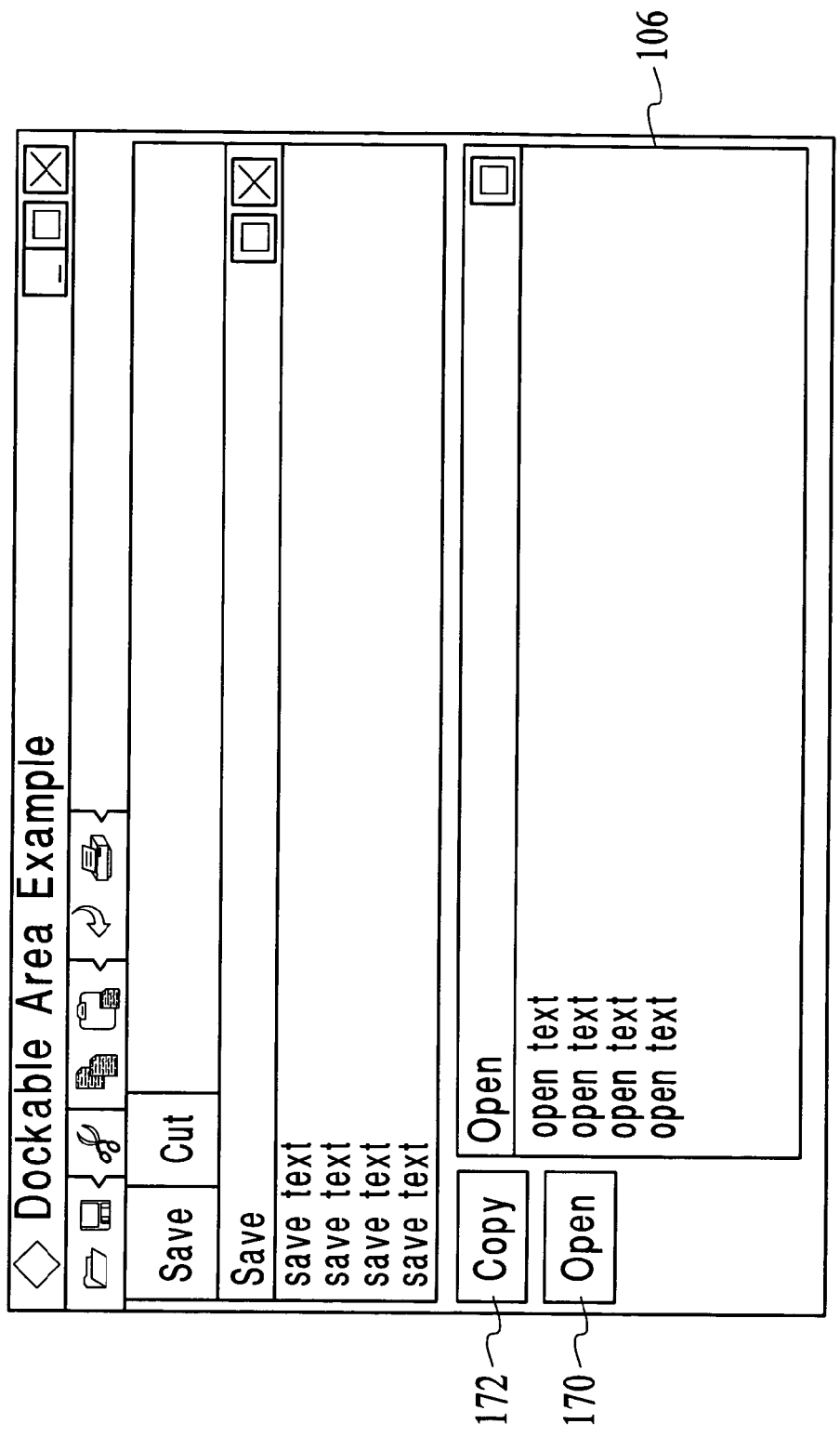

FIGS. 13-15 show resulting configurations of a new notebook of the docking pane 106 of FIG. 12 after docking the content pane 102 in accordance with an embodiment of the present invention. Referring to FIGS. 12 and 13, if the content pane 102 is dropped into the docking area 123, the content pane 102 and the copy content pane are placed into a new notebook indicated by tabs. The notebook is configured such that the tabs are at the bottom of the docking pane 106. The content pane 102 has an open tab 170 in the right tab position and the copy content pane has a copy tab 172 in the left tab position. Referring to FIGS. 12 and 14, if the content pane 102 is dropped into the docking area 160, the results are the same as those in FIG. 13 except that the open tab 170 is in the left tab position and the copy tab 172 in the right tab position.

Referring to FIGS. 12 and 15, if the content pane 102 is dropped into the docking area 162, a new notebook is created for the content panes and is configured such that the tabs are at the left of the docking pane 106. The open tab 170 is in the bottom tab position and the copy tab 172 is in the top tab position. Similarly, if the content pane 102 is dropped into the docking area 164, the results are the same as those in FIG. 15 except that the open tab 170 would be in the top tab position and the copy tab 172 would be in the bottom tab position. If the content pane 102 is dropped into the docking areas 150/152 or 154/156, the tabs of the notebook are placed at the top or right of the docking pane 106, respectively. These docking areas 150-156 determine the relative tab positions in a similar manner described for the docking areas 123 and 160-164.

Referring to FIG. 12, the docking areas 180-186 function similarly to the docking areas 136-142 of FIG. 6, respectively.

Figure 16:
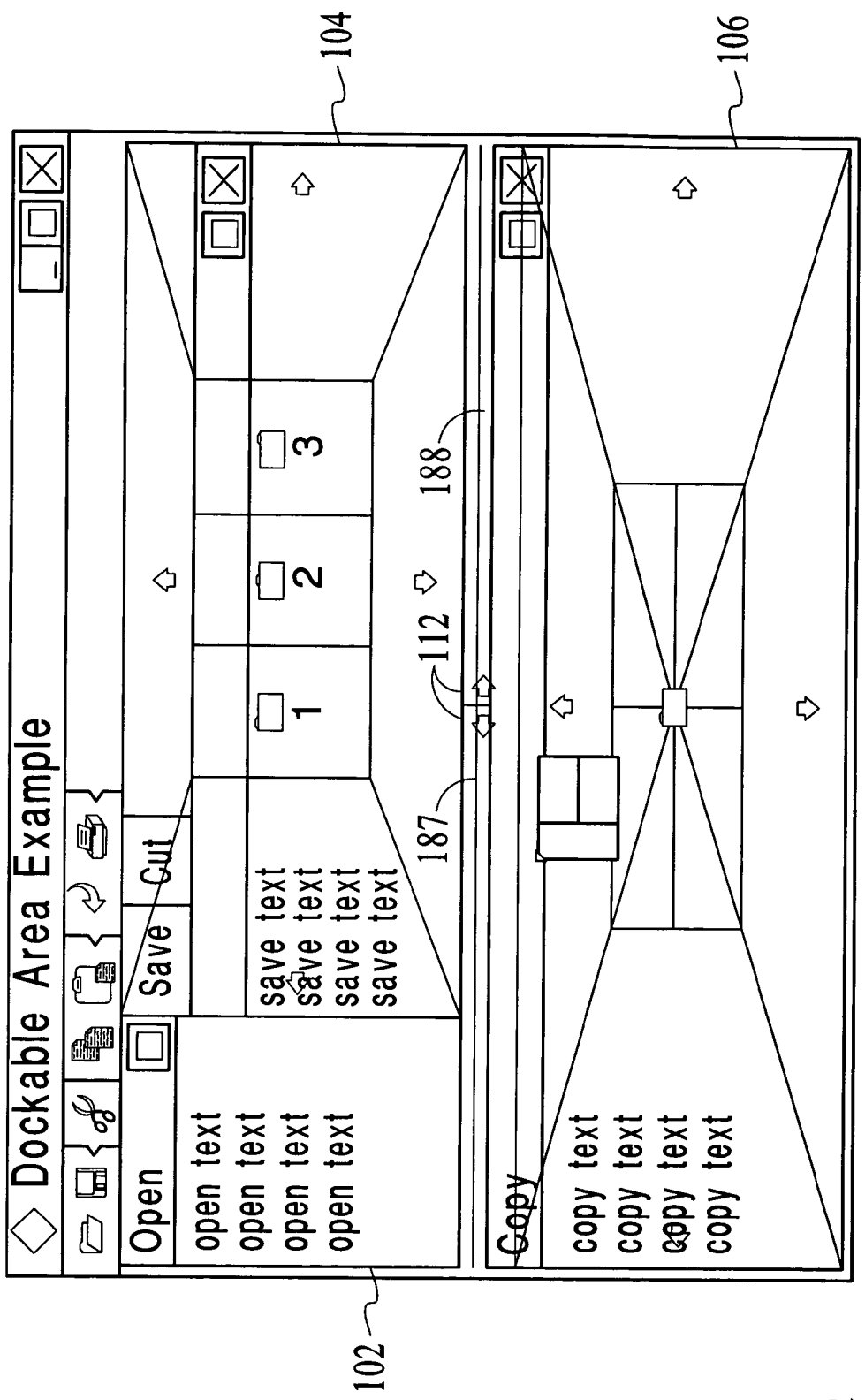
FIG. 16 illustrates a docking map of FIG. 4 in accordance with an embodiment of the present invention.
Figure 17:
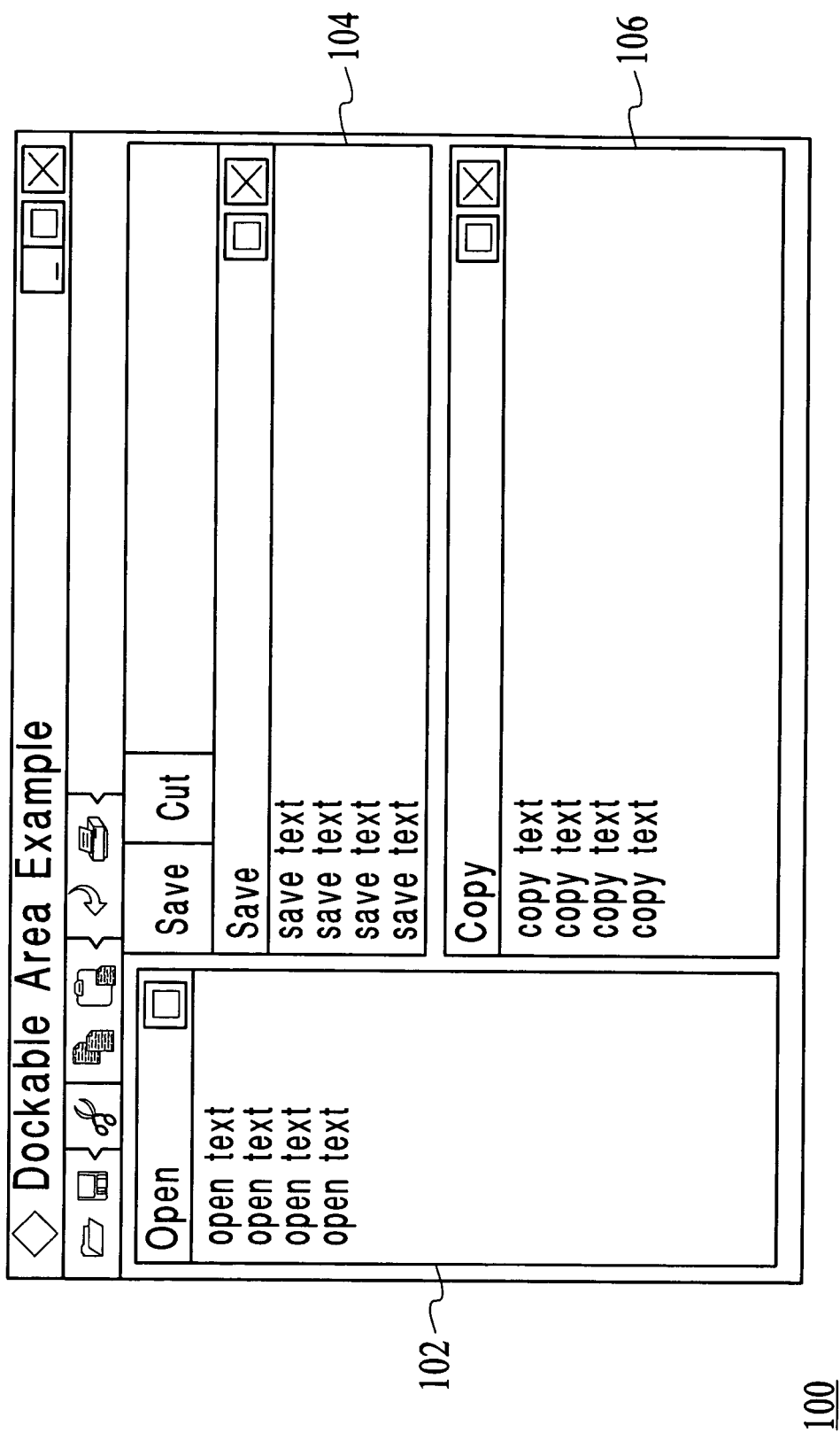
FIGS. 17 and 18 show resulting configurations of a content pane and docking panes of FIG. 16 after docking a content pane in accordance with an embodiment of the present invention.
Figure 18:
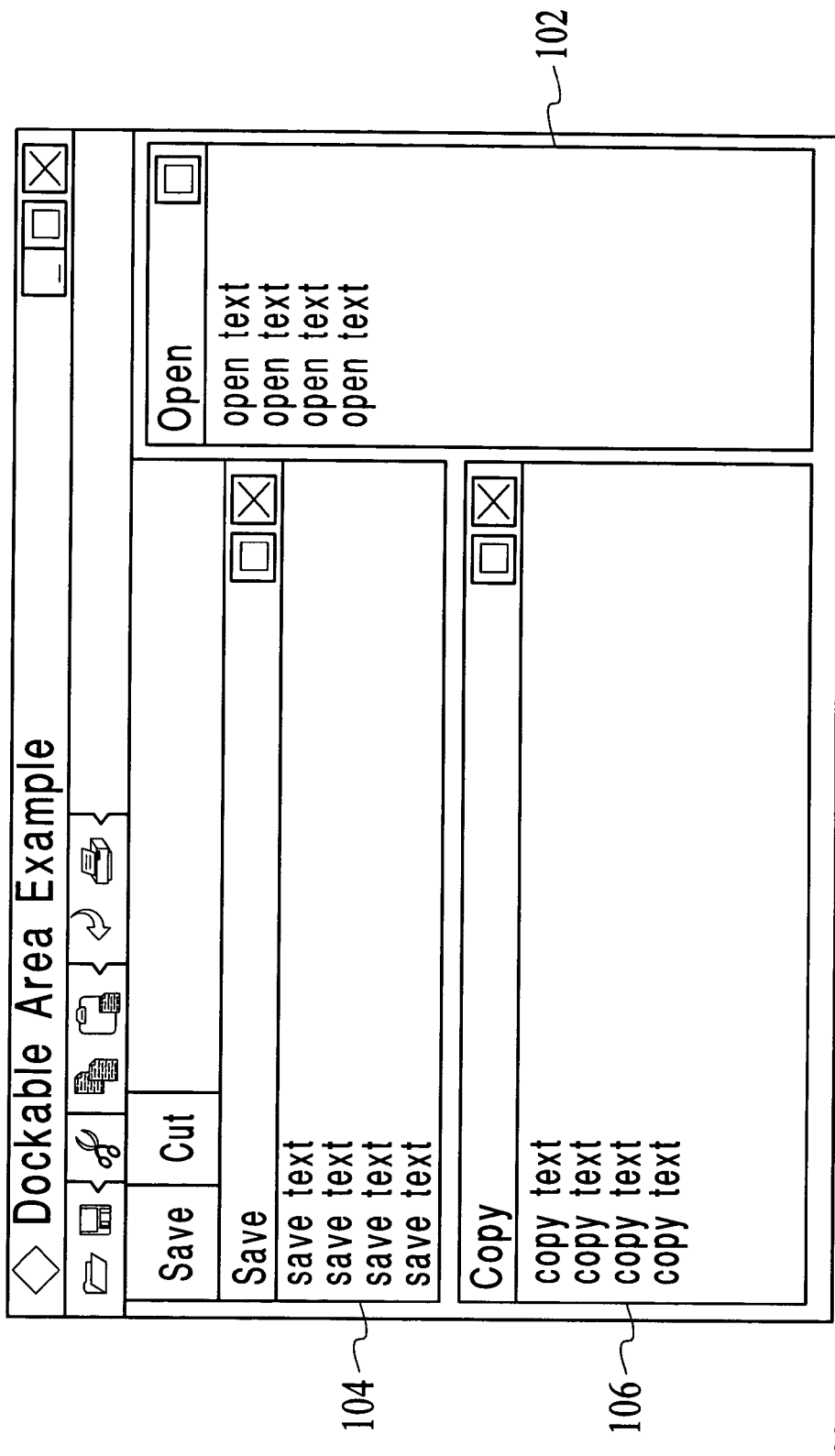

FIG. 16 illustrates the docking map 112 of FIG. 4 in accordance with an embodiment of the present invention. The docking map 112 includes docking areas for docking the content pane 102 relative to other docking panes of the host window 100. The docking map 112 includes two docking areas 187 and 188. And the thumbnail is positioned to select docking area 187. FIGS. 17 and 18 show resulting configurations of the content pane 102 and the docking panes 104 and 106 of FIG. 16 after docking the content pane 102 in accordance with an embodiment of the present invention. Referring to FIGS. 16 and 17, if the content pane 102 is dropped into the docking area 187, the content pane 102 is docked adjacent to and to the left of both the docking panes 104 and 106 and is separated from them by a vertical splitter Referring to FIGS. 16 and 18, if the content pane 102 is dropped into the docking area 188, the content pane 102 is docked adjacent to and to the right of both the docking panes 104 and 106 and is separated from them by a vertical splitter bar. Alternatively, a docking map can be created for any splitter depending on which content pane is grabbed for undocking and docking. For example, if the content pane of the docking pane 106 were grabbed, a docking map could appear over the vertical splitter between the content pane 102 and the docking pane 104.

Figure 19:
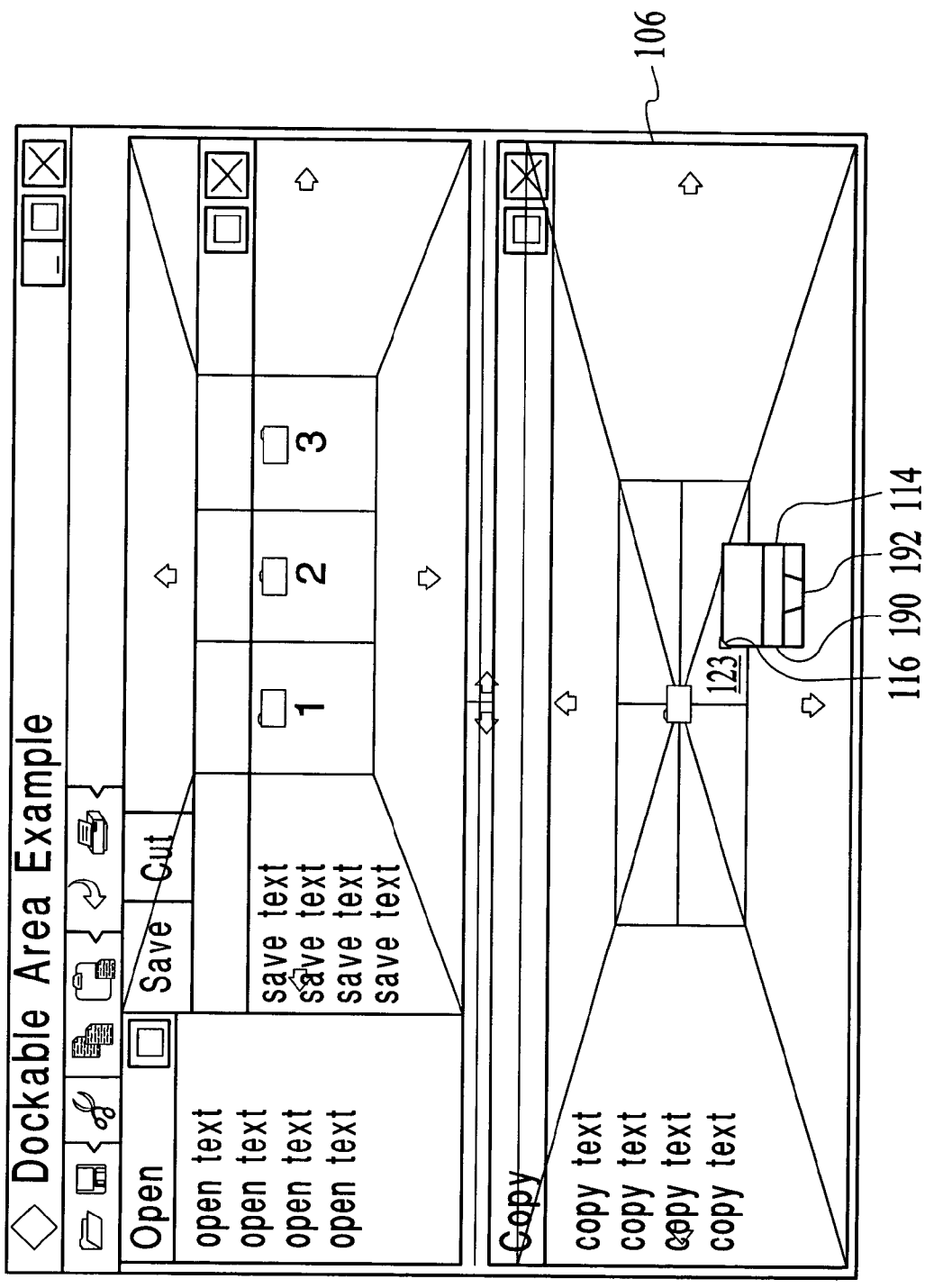
FIG. 19 illustrates the thumbnail, content pane, and docking panes of FIG. 4 in accordance with a preferred embodiment of the present invention.

FIG. 19 illustrates the thumbnail 114 of FIG. 4 in accordance with a preferred embodiment of the present invention. The thumbnail 114 comprises the hotspot 116, which is indicated visually to the user so that the thumbnail 114 can be more accurately placed over a target, docking area. The hotspot 116 can be made visually distinct from the other portions of the thumbnail by varying the shape, color, shading, texture, size, docking area of the hotspot 116, or any combination thereof. In a preferred embodiment, the hotspot 116 is shown as a dark triangle in the upper-left corner of the thumbnail 114. Alternatively, the hotspot 116 can be located on other corners or parts of the thumbnail 114 (e.g., in the center). With the hotspot 116, the thumbnail 114 represents a pointer in that the visible hotspot 116 is used to accurately navigate the content pane 102 over a target docking area. When the thumbnail 114 appears, it replaces the pointer. Alternatively, both an outline of the content pane 102 being dragged by the pointer and the pointer can shrink down to or be replaced by the thumbnail 114.

When the content pane 102 is floatable (i.e., not currently over a docking area), an outline of the content pane 102 is dragged where the outline represents the content pane 102 being dragged until it is dropped. Alternatively, the thumbnail 114 can appear in place of the outline and pointer immediately when the content pane 102 is dragged. As such, the thumbnail 114 represents the content pane 102 being dragged and is proportional to the content pane 102. As such, the thumbnail is called the drag window. When the content pane 102 is dockable (i.e., currently over a docking area), the thumbnail 114 represents the content pane 102 being dragged (as well as a pointer). In one embodiment, the thumbnail 114 has the size of about 4000 pixels (about 4 times the largest mouse pointer on Windows).

In addition, when the content pane 102 is dockable, the thumbnail 114 displays a preview of the final configuration of the host window 100 (i.e., notebook configuration and/or docking pane configuration). As illustrated in FIG. 19, the hotspot 116 is placed over the docking area 123 and if dropped will result in a particular final configuration in the host window 100. This final configuration will be displayed on the thumbnail 114. In other words, the thumbnail 114 is a miniature representation of the host window 100 after the content pane 102 is docked.

The thumbnail 114 indicates a splitter with a straight line, a notebook with a bent line, and the content pane being dragged with the selection-background color, with the same look and feel. Stilt referring to FIG. 19, the lower section 190 of the thumbnail 114 corresponding to the docking, pane 106 is darkened. Also, the tap-shaped section 192 of the thumbnail 114 corresponding to a new notebook tab is darkened. The tab-shaped section 192 is darkened to a lighter shade than the lower section 190 such that both the lower section 190 and the tab-shaped section 192 are visible and distinct. Alternatively, areas of the thumbnail 114 can be beveled to more dearly indicate the final configuration of the host window, including the content pane. Shallow to deep relief bevels can be used with varying pixel depths to adjust the clarity.

In a preferred embodiment, a content pane that has been grabbed for undocking or docking can be darkened to distinguish it visually from the docking panes. The content pane that is dragged is darkened to be distinctly darker than the content panes of the docking panes that the docking maps overlay. The content pane that is dragged can be darkened with a semitransparent screen overlay. The color of the semitransparent screen can be the same as the highlight color of the thumbnail, the colors of which can be changed by the user. In addition, the areas behind the docking maps can be dimmed/lightened to render the lines and symbols of the docking maps more clearly. These lightened areas are distinctly lighter than the content pane being dragged. This helps in identifying the content pane being dragged and to view the docking maps more clearly. In one embodiment, the target area is dimmed by 50%.

Figure 20:
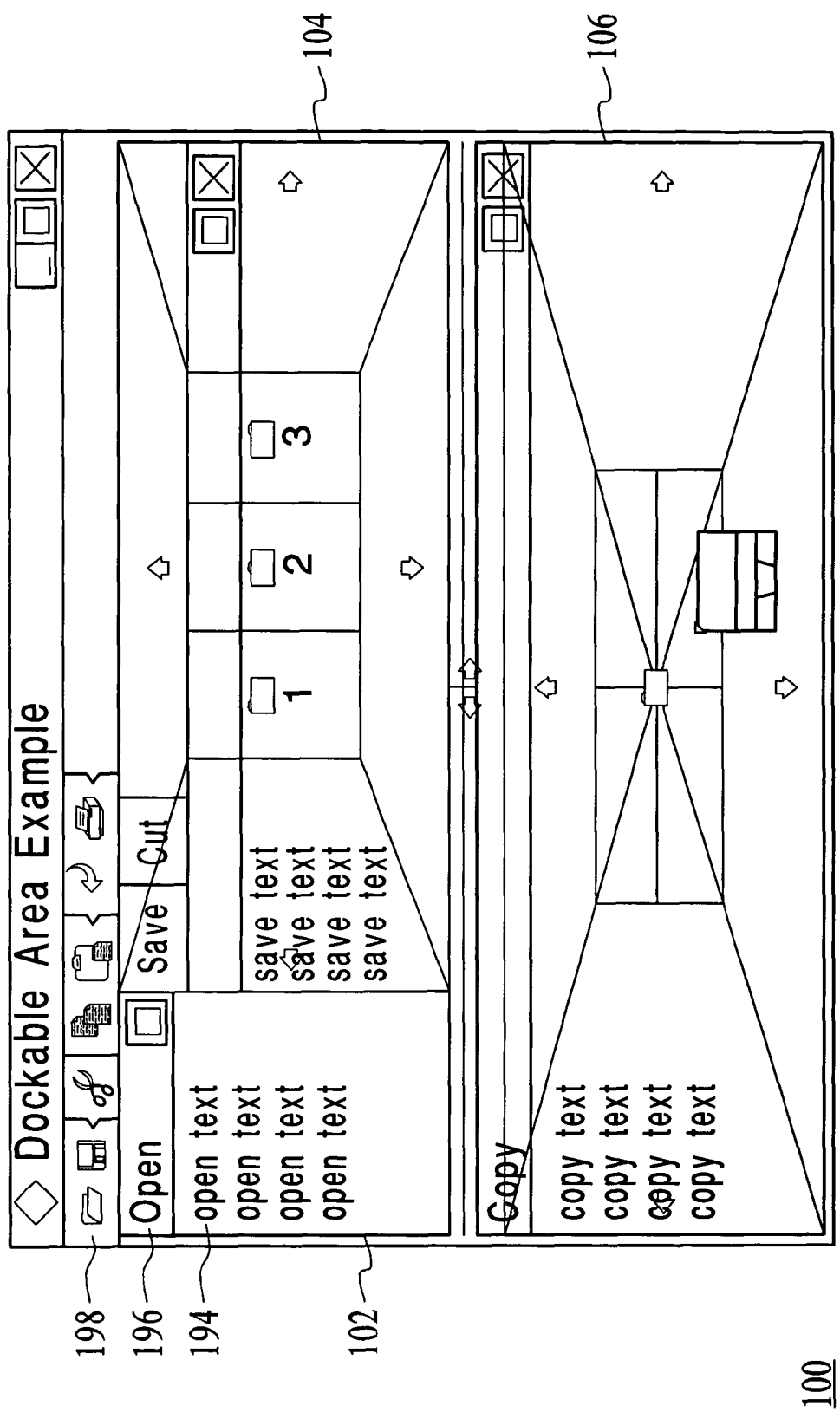
FIG. 20 illustrates the content pane of FIG. 4 in accordance with an embodiment of the present invention.

FIG. 20 illustrates the content pane 102 of FIG. 4 in accordance with an embodiment of the present invention. To drag the content pane 102, the pointer or cursor is placed over a drag bar 194. When the content pane 102 is docked, it has a title bar 196 and the drag bar 194 becomes visible when the cursor is placed over the title bar 196. The cursor can change when it is placed over the drag bar 194 or the title bar 196 (e.g., from a typical mouse pointer to an open hand). The cursor can change again when the mouse button is pressed (e.g., from an open hand to a closed or grabbing hand). The specific cursor used will depend on the specific application. While a mouse is typically used to drag the content pane 102, one of ordinary skill in the art readily recognizes that any type of pointing device could be used and that use would be within the spirit and scope of the present invention.

There are no restrictions as to where the content pane 102 can be dropped. If the content pane 102 is not dropped in a docking area of a docking map, the content pane 102 floats (i.e., remains within its own docking pane and undocked) and is positioned at the location where the content pane 102 was dropped. Dragging a floating content pane by its title bar merely moves the content pane together with its docking pane. Docking a floating content pane can be accomplished by grabbing its drag bar 194. When the content pane 102 is floating, its drag bar 194 is visible. The title bar or the drag bar can be oriented horizontally (preferably at the top of the content pane) or vertically (preferably at the left of the content pane).

If a docked content pane is closable, its title bar can have a close button. When the close button is selected, the content pane is hidden. If a docked content pane is not closable, it does not have a close button when docked and has a close button when floating. The content pane, if floating, returns to its parent pane when the close button is selected. A content pane can have a collapse button with the following states: disabled, maximize, minimize, restore, and hidden, and the following icons: disabled (unavailable), maximize, minimize, and restore.

The docking panes 104 and 106 can also be undocked and docked in a similar manner described above for the content pane 102. If a content pane to be undocked and docked already has within it an existing notebook with content panes, each content pane can be dragged separately in the manner described above. Thus, if a content pane is dragged from a docking pane in a notebook, the notebook will have one less content pane hosted in a docking pane therein. The dragged content pane can then be placed into a new notebook in another docking pane or can be put into its own docking pane. Alternatively, a set of content panes can be dragged together. The relative positions of their tags would remain the same even when docked into another docking pane with its own existing notebook and corresponding tabs. The set of tabs from the content panes to be undocked and docked can be treated like a single tab relative to the other tabs. Of course the positions of all tabs can be later reordered. Furthermore, floating content panes can be docked in a similar manner described above.

A tool bar 198 can also be undocked and docked in a similar manner described above for the content pane 102. The tool bar 198 can be floated or docked and can be dragged by its border. The tool bar 198 can be docked by closing its floating pane, or by grabbing its border and dragging the resulting thumbnail to a docking area. A thumbnail for a tool bar can have two appearances. When the tool bar is floatable, the thumbnail has the size of the floating pane (i.e., the pane of the tool bar as it floats). When the tool bar is dockable, it has the size of a docked toolbar.

The preferred embodiment in accordance with the present invention has the following advantages over conventional docking and undocking schemes. A content pane can be docked precisely with predictability. Furthermore, the docking of the content pane can determine a notebook configuration within a docking pane and/or a docking pane configuration within a host window. Furthermore, the content pane can be dropped anywhere in the host window without restrictions because if the content pane is not dropped in a docking area, the content pane floats.

A method and system in accordance to the present invention for providing feedback for docking a content pane in a host window is disclosed. The method and system provide one or more docking maps that include a plurality of docking areas into which a content pane can be dropped for docking into a host window. To facilitate in the docking procedure, a thumbnail associated with the content pane is provided, and the thumbnail has a visible hotspot making it easier to position the content pane over one of the docking areas. The hotspot indicates that the content pane can be accurately dropped into one of the docking areas. In addition, the docking areas provide multiple notebook configurations and provide multiple docking pane configurations based on the docking area into which the content pane is dropped. As a result, a user can precisely predict the final configuration of the host window, i.e., how the content pane will be docked and how the docking panes will adjust.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing feedback concerning a content pane to be docked in a host window using an electronic computing device, the method comprising:
   (a) causing the electronic computing device to provide at least one of a plurality of docking maps, wherein the at least one of a plurality of docking maps defines a plurality of docking areas there within, the plurality of docking areas configured for docking the content pane relative to a docking pane, wherein the at least one of a plurality of docking maps completely overlays the docking pane in the host window, wherein the docking map and docking areas are visible only during a docking operation;
   (b) causing the electronic computing device to position a thumbnail associated with the content pane over one of the plurality of docking areas of the at least one of a plurality of docking maps to select the one of the plurality of docking areas, wherein each of the plurality of docking areas correspond with a relative position on the docking pane within the host window in which the content pane is positioned in relation to other content panes in accordance with the at least one of a plurality of docking maps, and wherein the thumbnail is a miniature representation of the host window and the content pane after the content pane is docked; and
   (c) causing the electronic computing device to provide a hotspot visually on the thumbnail, wherein the hotspot indicates that the content pane can be dropped into the one of the plurality of docking areas the hotspot is visibly distinct from other portions of the thumbnail to allow for precise dropping of the content pane into the one of the plurality of docking areas for docking.

2. The method of claim 1 further comprising (d) providing at least one additional docking pane, wherein at least one of a plurality of docking maps is associated with the at least one additional docking pane.

3. The method of claim 2 further comprising (e) darkening the content pane to distinguish it from the at least one docking pane.

4. The method of claim 2 further comprising (e) lightening the at least one docking pane to render the at least one of a plurality of docking maps more clearly.

5. The method of claim 1 further comprising:
   (d) generating a preview of a final configuration of the host window; and
   (e) displaying the preview on the thumbnail.

6. The method of claim 5 wherein the final configuration indicates at least one of a configuration of tabs in a notebook and a configuration of a plurality of docking panes in the host window.

7. The method of claim 1 wherein providing the hotspot (c) further comprises (c1) visually distinguishing the hotspot from other portions of the thumbnail by varying at least one of the shape, color, shading, texture, and size of the hotspot.

8. The method of claim 1 further comprising (d) floating the content pane when it is placed but not placed into one of the plurality of docking areas, wherein there are no restrictions as to where the content pane can be placed.

9. The method of claim 1 further comprising (d) generating at least one new notebook when the content pane is dropped into one of the plurality of docking areas.

10. The method of claim 9 further comprising (e) configuring the at least one new notebook based on the docking area into which the content pane is dropped.

11. The method of claim 1 further comprising (d) configuring a plurality of docking panes based on a docking area into which the content pane is dropped.

12. A computer readable medium containing program instructions for providing feedback concerning a content pane to be docked in a host window, the program instructions comprising:
   a non-transitory computer readable medium;
   (a) first programmatic instructions for providing at least one of a plurality of docking maps, wherein the at least one of a plurality of docking maps includes a plurality of docking areas there within, the plurality of docking areas configured for docking the content pane relative to a docking pane, wherein the at least one of a plurality of docking maps completely overlays the docking pane in the host window, and wherein the docking map and docking areas are visible only during a docking operation;
   (b) second programmatic instructions for positioning a thumbnail associated with the content pane over one of the plurality of docking areas to select the one of the plurality of docking areas of the at least one of a plurality of docking maps, wherein each of the plurality of docking areas correspond with a relative position on the docking pane within the host window in which the content pane is positioned in relation to other content panes in accordance with the at least one of a plurality of docking maps and wherein the thumbnail is a miniature representation of the host window and the content pane after the content pane is docked; and
   (c) third programmatic instructions for providing a hotspot visually on the thumbnail, wherein the hotspot indicates that the content pane can be dropped into the one of the plurality of docking areas the hotspot is visibly distinct from other portions of the thumbnail to allow for precise dropping of the content pane into the one of the plurality of docking areas for docking.

13. The computer readable medium of claim 12 further comprising (d) fourth programmatic instructions for providing at least one additional docking pane, wherein the at least one of a plurality of docking maps is associated with the at least one additional docking pane.

14. The computer readable medium of claim 13 further comprising program instructions for (e) darkening the content pane to distinguish it from the at least one docking pane.

15. The computer readable medium of claim 13 further comprising program instructions for (e) lightening the at least one docking pane to render the at least one docking map more clearly.

16. The computer readable medium of claim 12 further comprising:
(d) fifth programmatic instructions for generating a preview of a final configuration of the host window; and
(e) sixth programmatic instructions for displaying the preview on the thumbnail.

17. The computer readable medium of claim 16 wherein the final configuration indicates at least one of a configuration of tabs in a notebook and a configuration of a plurality of docking panes in the host window.

18. The computer readable medium of claim 12 wherein providing the hotspot (c) further comprises (c1) visually distinguishing the hotspot from other portions of the thumbnail by varying at least one of the shape, color, shading, texture, and size of the hotspot.

19. The computer readable medium of claim 12 wherein at least one of a symbol, a label, and the relative position of the at least one docking area visually indicates its function.

20. The computer readable medium of claim 12 wherein the thumbnail represents a pointer.

21. The computer readable medium of claim 12 wherein the at least one docking map can be used for docking a tool bar.

22. A system of computer hardware for providing feedback concerning a content pane to be docked in a host window, the system of computer hardware comprising:
at least one of a plurality of docking maps, wherein the at least one of a plurality of docking maps includes a plurality of docking areas there within, the plurality of docking areas configured for docking the content pane relative to a docking pane, wherein the at least one of a plurality of docking maps completely overlays the docking pane in the host window, and wherein the docking map and docking areas are visible only during a docking operation; and
a thumbnail associated with the content pane, wherein the thumbnail represents the content pane as it is dragged over one of the plurality of docking areas of the at least one of a plurality of docking maps to select the one of the plurality of docking areas, wherein each of the plurality of docking areas correspond with a relative position on the docking pane within the host window in which the content pane is positioned in relation to other content panes in accordance with the at least one of a plurality of docking maps, the thumbnail comprising a hotspot, wherein the hotspot is visually visibly distinct from the other portions of the thumbnail, wherein the hotspot indicates that the content pane can be precisely dropped into the one of the plurality of docking areas to allow for precise dropping of the content pane into the one of the plurality of docking areas for docking and wherein the thumbnail is a miniature representation of the host window and the content pane after the content pane is docked.

23. The system of claim 22 wherein the hotspot is positioned in a corner of the thumbnail.

24. The system of claim 22 wherein the thumbnail represents a final configuration of the host window.

* * * * *